(12) United States Patent
Liu et al.

(10) Patent No.: US 12,360,813 B2
(45) Date of Patent: Jul. 15, 2025

(54) RESOURCE ALLOCATION METHOD AND APPARATUS AND ARTIFICIAL INTELLIGENCE TRAINING SYSTEM

(71) Applicant: SUZHOU METABRAIN INTELLIGENT TECHNOLOGY CO., LTD., Jiangsu (CN)

(72) Inventors: Huixing Liu, Jiangsu (CN); Pei Chen, Jiangsu (CN)

(73) Assignee: SUZHOU METABRAIN INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/871,459

(22) PCT Filed: Jun. 29, 2023

(86) PCT No.: PCT/CN2023/104043
§ 371 (c)(1),
(2) Date: Dec. 3, 2024

(87) PCT Pub. No.: WO2024/113836
PCT Pub. Date: Jun. 6, 2024

(65) Prior Publication Data
US 2025/0165293 A1   May 22, 2025

(30) Foreign Application Priority Data
Nov. 28, 2022   (CN) .......................... 202211498123.3

(51) Int. Cl.
G06F 9/46 (2006.01)
G06F 9/50 (2006.01)
G06N 20/00 (2019.01)

(52) U.S. Cl.
CPC .......... *G06F 9/5027* (2013.01); *G06N 20/00* (2019.01)

(58) Field of Classification Search
CPC .............................. G06F 9/5027; G06N 20/00
See application file for complete search history.

(56) References Cited

U.S. PATENT DOCUMENTS

2021/0191780 A1   6/2021 Luo et al.

FOREIGN PATENT DOCUMENTS

| CN | 109885389 A | 6/2019 |
| CN | 110413408 A | 11/2019 |

(Continued)

OTHER PUBLICATIONS

KR10-2024-7041879 Request for the Submission of an Opinion dated Apr. 3, 2025.

*Primary Examiner* — Gregory A Kessler
(74) *Attorney, Agent, or Firm* — IPro, PLLC

(57) ABSTRACT

A method of resource allocation includes: when it is detected that a target training task in a target development environment is started, triggering loading of a client plugin library. Therefore, the client plugin library may redirect a loading process of a target deep learning framework for the target training task, to hijack a startup process of the deep learning framework, and a target graphics processing unit request is generated during this process to request allocation of graphics processing unit resources for the target training task. Compared to the prior art, this embodiment of the present disclosure starts from a perspective of the deep learning framework, analyzes a loading logic of the deep learning framework when the training task is started, and achieves dynamic graphics processing unit sharing through hijacking the framework.

19 Claims, 5 Drawing Sheets

--- when it is detected that a target training task in a target development environment is started, acquiring a target graphics processing unit request from the client plugin library, wherein the target graphics processing unit request is generated after redirecting a loading process of a target deep learning framework for the target training task when the client plugin library detects that the target training task in the target development environment is started — 101 in response to the target graphics processing unit request, allocating graphics processing unit resources for the target training task — 102

(56) References Cited

FOREIGN PATENT DOCUMENTS

| | | |
|---|---|---|
| CN | 110941481 A | 3/2020 |
| CN | 111223036 A | 6/2020 |
| CN | 113867959 A | 12/2021 |
| CN | 114564302 A | 5/2022 |
| CN | 114595058 A | 6/2022 |
| CN | 114721818 A | 7/2022 |
| CN | 114741175 A | 7/2022 |
| CN | 114816746 A | 7/2022 |
| CN | 115562878 A | 1/2023 |
| CN | 115601221 A | 1/2023 |
| KR | 20210076882 A | 6/2021 |
| KR | 20210122832 A | 10/2021 |
| KR | 20220058844 A | 5/2022 |

RESOURCE ALLOCATION METHOD AND APPARATUS AND ARTIFICIAL INTELLIGENCE TRAINING SYSTEM

CROSS-REFERENCE TO RELATED APPLICATION

The present disclosure claims the priority of the Chinese patent application filed on Nov. 28, 2022 before the CNIPA, China National Intellectual Property Administration with the application number of 202211498123.3 and the title of "METHOD AND APPARATUS OF RESOURCE ALLOCATION AND ARTIFICIAL INTELLIGENCE TRAINING SYSTEM" which is incorporated herein in its entirety by reference.

FIELD

The present disclosure relates to the technical field of artificial intelligence training and more particularly, to a method and apparatus of resource allocation, and an artificial intelligence training system.

BACKGROUND

In the era of artificial intelligence and big data, with the continuous increase of data volume and the development of deep learning algorithms, the demand for computing power is also increasing, leading to the emergence of various types of high-performance devices, such as general-purpose graphics processing units. Graphics processing units have strong computing power but are expensive, and are limited by various conditions in practical applications, resulting in low overall utilization of the graphics processing units. Compared to the high price of the graphics processing units, enterprises and users are more concerned about the issue of utilization. Therefore, the industry has conducted extensive exploration on this issue, with graphics processing unit sharing (reuse) being particularly important.

The default Naked graphics processing unit dynamic sharing mode does not determine whether resources are sufficient when users submit tasks. Multi-user tasks will preempt graphics processing unit resources. Taking graphics processing unit memory as an example, if there is not enough remaining memory, it may cause OOM (Out of Memory, an error code generated when there is insufficient internal memory (memory)), which may lead to the failure and exit of all user tasks.

To solve the resource preemption OOM issue, the industry usually utilizes k8s (Kubernetes, an open-source system for automated deployment, scaling, and management of containerized applications) or container management systems to manage graphics processing unit resources, combined with pods (nodes) or containers. When starting a graphics processing unit task, the management system first determines whether the idle resources of the graphics processing unit satisfy the graphics processing unit resources required for the task. If they satisfy the requirements, a running container will be created on the corresponding node according to the scheduling strategy and the graphics processing unit resources will be allocated to the container. Then, the graphics processing unit task will be run, and the container and corresponding graphics processing unit resources will be recycled after the task is ended.

This type of mode may only start tasks through the interface and cannot start tasks through the underlying command line. Once the user operates at the underlying level, it will cause confusion in the graphics processing unit resources. Moreover, this type of mode requires the creation of a container every time a task is started, which is not conducive to user editing and debugging scripts. For this reason, the industry usually adopts a development environment approach to share the graphics processing units.

Users need to first create a development environment and bind the CPU (Central Processing Unit) and graphics processing unit resources to the development environment of the user. Once the development environment is successfully created, the corresponding graphics processing unit resources will be bound, that is, pre-allocation mode. In this mode, users may log in to the development environment in a shell mode (referring to script programs written in the shell), which is relatively convenient for development and debugging. However, the biggest drawback of this mode is poor flexibility and a high probability of idle graphics processing unit resources. The reason is that pre-allocated graphics processing unit resources cannot be used by other users even when the user do not use them, resulting in low overall utilization of the graphics processing unit resources of the node.

SUMMARY

In view of the above problems, a method and apparatus of resource allocation, and an artificial intelligence training system are provided to overcome or at least partially solve the above problems.

A method of resource allocation is applied to an artificial intelligence training system, the artificial intelligence training system includes a client plugin library and at least one node, a plurality of development environments are created in each node, and the method includes:
  when it is detected that a target training task in a target development environment is started, acquiring a target graphics processing unit request from the client plugin library, wherein the target graphics processing unit request is generated after redirecting a loading process of a target deep learning framework for the target training task when the client plugin library detects that the target training task in the target development environment is started; and
  in response to the target graphics processing unit request, allocating graphics processing unit resources for the target training task.

In some embodiments of the present disclosure, in response to the target graphics processing unit request, allocating the graphics processing unit resources for the target training task includes:
  determining a target graphics processing unit quota preconfigured for the target development environment; and
  according to the target graphics processing unit quota and the target graphics processing unit request, allocating the graphics processing unit resources for the target training task.

In some embodiments of the present disclosure, the method further includes:
  receiving a graphics processing unit quota input by a user for each of the plurality of development environments.

In some embodiments of the present disclosure, the target node corresponding to the target development environment is deployed with corresponding graphics processing unit resources, the target graphics processing unit quota includes a number of the target graphics processing unit quotas, and according to the target graphics processing unit quota and the target graphics processing unit request, allocating the graphics processing unit resources for the target training task includes:

determining a number of graphics processing units currently used by the target development environment;

in response to the number of the graphics processing units currently used being less than the number of the target graphics processing unit quotas, allocating the graphics processing unit resources for the target training task from graphics processing units not currently used by the target development environment in the graphics processing unit resources corresponding to the target node; and in response to the number of the graphics processing units currently used being equal to the number of the target graphics processing unit quotas, allocating the graphics processing unit resources for the target training task from the graphics processing units currently used by the target development environment.

In some embodiments of the present disclosure, allocating the graphics processing unit resources for the target training task from the graphics processing units currently used by the target development environment includes:

determining a number of graphics processing units required for the target training task;

in response to the number of the graphics processing units required being greater than the number of the graphics processing units currently used, generating scheduling failure information; and in response to the number of the graphics processing units required being not greater than the number of the graphics processing units currently used, sorting the graphics processing units currently used by the target development environment according to a number of tasks, and allocating the graphics processing unit resources for the target training task from top N graphics processing units with a minimum number of tasks of the graphics processing units currently used by the target development environment;

where N is the number of the graphics processing units required for the target training task.

In some embodiments of the present disclosure, allocating the graphics processing unit resources for the target training task from the graphics processing units not currently used by the target development environment in the graphics processing unit resources corresponding to the target node includes:

determining a current number of tasks of the graphics processing units not currently used by the target development environment, and determining a number of graphics processing units with the current number of tasks less than a task threshold;

in response to the number of the graphics processing units with the current number of tasks less than the task threshold being less than a number of graphics processing units required for the target training task, allocating the graphics processing unit resources for the target training task from the graphics processing units with the current number of tasks less than the task threshold and the graphics processing units currently used by the target development environment; and in response to the number of the graphics processing units with the current number of tasks less than the task threshold being not less than the number of graphics processing units required for the target training task, allocating the graphics processing unit resources for the target training task from the graphics processing units with the current number of tasks less than the task threshold.

In some embodiments of the present disclosure, allocating the graphics processing unit resources for the target training task from the graphics processing units with the current number of tasks less than the task threshold and the graphics processing units currently used by the target development environment includes:

according to the number of the graphics processing units required for the target training task and a number of the graphics processing units not currently used by the target development environment in the graphics processing unit resources corresponding to the target node, determining a number of reused graphics processing units;

in response to the number of the graphics processing units currently used being less than the number of the reused graphics processing units, generating scheduling failure information; and in response to the number of the graphics processing units currently used being not less than the number of the reused graphics processing units, allocating the graphics processing unit resources for the target training task from top M graphics processing units with a minimum number of tasks of the graphics processing units currently used by the target development environment and the graphics processing units with the current number of tasks less than task threshold;

where M is the number of the reused graphics processing units.

In some embodiments of the present disclosure, the method further includes:

generating and storing allocation information of the graphics processing unit resources for each of the plurality of development environments.

In some embodiments of the present disclosure, the target graphics processing unit quota further includes a target graphics processing unit memory quota capacity, and according to the target graphics processing unit quota and the target graphics processing unit request, allocating the graphics processing unit resources for the target training task further includes:

according to the target graphics processing unit memory quota capacity, allocating a graphics processing unit memory capacity for the target training task.

In some embodiments of the present disclosure, according to the target graphics processing unit memory quota capacity, allocating the graphics processing unit memory capacity for the target training task includes:

determining whether any other training task is in the target development environment when starting the target training task;

in response to no other training task being in the target development environment, according to the target graphics processing unit memory quota capacity, allocating the graphics processing unit memory capacity for the target training task;

in response to another training task being in the target development environment, determining a remaining graphics processing unit memory quota capacity of the target development environment according to the target training task, and updating the allocation information according to the remaining graphics processing unit memory quota capacity of the target development environment.

In some embodiments of the present disclosure, the method further includes:
when it is detected that the target training task is ended, recycling the graphics processing unit resources allocated for the target training task.

In some embodiments of the present disclosure, the method further includes:
when no heartbeat information for the target training task is received within a preset period, recycling the graphics processing unit resources allocated for the target training task.

An embodiment of the present disclosure further provides an artificial intelligence training system, including at least one node, a node manager and a client plugin library, a plurality of development environments being created in each node; wherein
the client plugin library is configured for, when detecting that a target training task in a target development environment is started, generating a target graphics processing unit request after redirecting a loading process of a target deep learning framework for the target training task, and sending the target graphics processing unit request to the node manager;
the node manager is configured for, in response to the target graphics processing unit request, allocating graphics processing unit resources for the target training task; and
the target deep learning framework performs artificial intelligence training using the graphics processing unit resources allocated by the node manager.

In some embodiments of the present disclosure, the node manager is configured for determining a target graphics processing unit quota pre-configured for the target development environment, and according to the target graphics processing unit quota and the target graphics processing unit request, allocating the graphics processing unit resources for the target training task.

In some embodiments of the present disclosure, the node manager includes a graphics processing unit management module;
the graphics processing unit management module is configured for storing a graphics processing unit quota input by a user for each of the plurality of development environments.

In some embodiments of the present disclosure, the target node corresponding to the target development environment is deployed with corresponding graphics processing unit resources, the target graphics processing unit quota includes a number of the target graphics processing unit quotas;
the node manager is configured for determining a number of graphics processing units currently used by the target development environment; in response to the number of the graphics processing units currently used being less than the number of the target graphics processing unit quotas, allocating the graphics processing unit resources for the target training task from graphics processing units not currently used by the target development environment in the graphics processing unit resources corresponding to the target node; and in response to the number of the graphics processing units currently used being equal to the number of the target graphics processing unit quotas, allocating the graphics processing unit resources for the target training task from the graphics processing units currently used by the target development environment.

In some embodiments of the present disclosure, the node manager is configured for determining a number of graphics processing units required for the target training task; in response to the number of the graphics processing units required being greater than the number of the graphics processing units currently used, generating scheduling failure information; and in response to the number of the graphics processing units required being not greater than the number of the graphics processing units currently used, sorting the graphics processing units currently used by the target development environment according to a number of tasks, and allocating the graphics processing unit resources for the target training task from top N graphics processing units with a minimum number of tasks of the graphics processing units currently used by the target development environment; where N is the number of the graphics processing units required for the target training task.

In some embodiments of the present disclosure, the node manager is configured for determining a current number of tasks of the graphics processing units not currently used by the target development environment, and determining a number of graphics processing units with the current number of tasks less than a task threshold; in response to the number of the graphics processing units with the current number of tasks less than the task threshold being less than a number of graphics processing units required for the target training task, allocating the graphics processing unit resources for the target training task from the graphics processing units with the current number of tasks less than the task threshold and the graphics processing units currently used by the target development environment; and in response to the number of the graphics processing units with the current number of tasks less than the task threshold being not less than the number of the graphics processing units required for the target training task, allocating the graphics processing unit resources for the target training task from the graphics processing units with the current number of tasks less than the task threshold.

In some embodiments of the present disclosure, the node manager is configured for, according to the number of the graphics processing units required for the target training task and a number of the graphics processing units not currently used by the target development environment in the graphics processing unit resources corresponding to the target node, determining a number of reused graphics processing units; in response to the number of the graphics processing units currently used being less than the number of the reused graphics processing units, generating scheduling failure information; and in response to the number of the graphics processing units currently used being not less than the number of the reused graphics processing units, allocating the graphics processing unit resources for the target training task from top M graphics processing units with a minimum number of tasks of the graphics processing units currently used by the target development environment and the graphics processing units with the current number of tasks less than task threshold; where M is the number of the reused graphics processing units.

In some embodiments of the present disclosure, the node manager includes an auxiliary module;
the auxiliary module is configured for recording an allocation process of the node manager, and generating and storing allocation information of the graphics processing unit resources for each of the plurality of development environments.

In some embodiments of the present disclosure, the target graphics processing unit quota further includes a target graphics processing unit memory quota capacity;

the node manager is further configured for, according to the target graphics processing unit memory quota capacity, allocating a graphics processing unit memory capacity for the target training task.

In some embodiments of the present disclosure, the node manager is configured for determining whether any other training task is in the target development environment when starting the target training task; in response to no other training task being in the target development environment, according to the target graphics processing unit memory quota capacity, allocating the graphics processing unit memory capacity for the target training task; in response to another training task being in the target development environment, determining a remaining graphics processing unit memory quota capacity of the target development environment according to the target training task, and updating the allocation information according to the remaining graphics processing unit memory quota capacity of the target development environment.

In some embodiments of the present disclosure, the node manager is further configured for, when it is detected that the target training task is ended, recycling the graphics processing unit resources allocated for the target training task.

In some embodiments of the present disclosure, the node manager is further configured for, when no heartbeat information for the target training task is received within a preset period, recycling the graphics processing unit resources allocated for the target training task.

An embodiment of the present disclosure further provides an apparatus of resource allocation, which is applied to an artificial intelligence training system, the artificial intelligence training system includes a client plugin library and at least one node, a plurality of development environments are created in each node, and the apparatus includes:
  a request module configured for, when it is detected that a target training task in a target development environment is started, acquiring a target graphics processing unit request from the client plugin library, wherein the target graphics processing unit request is generated after redirecting a loading process of a target deep learning framework for the target training task when the client plugin library detects that the target training task in the target development environment is started; and
  an allocation module configured for, in response to the target graphics processing unit request, allocating graphics processing unit resources for the target training task.

In some embodiments of the present disclosure, the allocation module is configured for determining a target graphics processing unit quota pre-configured for the target development environment; and according to the target graphics processing unit quota and the target graphics processing unit request, allocating the graphics processing unit resources for the target training task.

In some embodiments of the present disclosure, the apparatus further includes:
  a quota receiving module configured for receiving a graphics processing unit quota input by a user for each of the plurality of development environments.

In some embodiments of the present disclosure, the target node corresponding to the target development environment is deployed with corresponding graphics processing unit resources, the target graphics processing unit quota includes a number of the target graphics processing unit quotas, and the allocation module is configured for determining a number of graphics processing units currently used by the target development environment; in response to the number of the graphics processing units currently used being less than the number of the target graphics processing unit quotas, allocating the graphics processing unit resources for the target training task from graphics processing units not currently used by the target development environment in the graphics processing unit resources corresponding to the target node; and in response to the number of the graphics processing units currently used being equal to the number of the target graphics processing unit quotas, allocating the graphics processing unit resources for the target training task from the graphics processing units currently used by the target development environment.

In some embodiments of the present disclosure, the allocation module is configured for determining a number of graphics processing units required for the target training task; in response to the number of the graphics processing units required being greater than the number of the graphics processing units currently used, generating scheduling failure information; and in response to the number of the graphics processing units required being not greater than the number of the graphics processing units currently used, sorting the graphics processing units currently used by the target development environment according to a number of tasks, and allocating the graphics processing unit resources for the target training task from top N graphics processing units with a minimum number of tasks of the graphics processing units currently used by the target development environment; where N is the number of the graphics processing units required for the target training task.

In some embodiments of the present disclosure, the allocation module is configured for determining a current number of tasks of the graphics processing units not currently used by the target development environment, and determining a number of graphics processing units with the current number of tasks less than a task threshold; in response to the number of the graphics processing units with the current number of tasks less than the task threshold being less than a number of graphics processing units required for the target training task, allocating the graphics processing unit resources for the target training task from the graphics processing units with the current number of tasks less than the task threshold and the graphics processing units currently used by the target development environment; and in response to the number of the graphics processing units with the current number of tasks less than the task threshold being not less than the number of the graphics processing units required for the target training task, allocating the graphics processing unit resources for the target training task from the graphics processing units with the current number of tasks less than the task threshold.

In some embodiments of the present disclosure, the allocation module is configured for, according to the number of the graphics processing units required for the target training task and a number of the graphics processing units not currently used by the target development environment in the graphics processing unit resources corresponding to the target node, determining a number of reused graphics processing units; in response to the number of the graphics processing units currently used being less than the number of the reused graphics processing units, generating scheduling failure information; and in response to the number of the graphics processing units currently used being not less than the number of the reused graphics processing units, allocating the graphics processing unit resources for the target training task from top M graphics processing units with a minimum number of tasks of the graphics processing units currently used by the target development environment and the graphics processing units with the current number of tasks less than task threshold; where M is the number of the reused graphics processing units.

In some embodiments of the present disclosure, the apparatus further includes:

an allocation information generation module configured for generating and storing allocation information of the graphics processing unit resources for each of the plurality of development environments.

In some embodiments of the present disclosure, the target graphics processing unit quota further includes a target graphics processing unit memory quota capacity, and the allocation module is further configured for, according to the target graphics processing unit memory quota capacity, allocating a graphics processing unit memory capacity for the target training task.

In some embodiments of the present disclosure, the allocation module is configured for determining whether any other training task is in the target development environment when starting the target training task; in response to no other training task being in the target development environment, according to the target graphics processing unit memory quota capacity, allocating the graphics processing unit memory capacity for the target training task; in response to another training task being in the target development environment, determining a remaining graphics processing unit memory quota capacity of the target development environment according to the target training task, and updating the allocation information according to the remaining graphics processing unit memory quota capacity of the target development environment.

In some embodiments of the present disclosure, the apparatus further includes:

a first recycling module configured for, when it is detected that the target training task is ended, recycling the graphics processing unit resources allocated for the target training task.

In some embodiments of the present disclosure, the apparatus further includes:

a second recycling module configured for, when no heartbeat information for the target training task is received within a preset period, recycling the graphics processing unit resources allocated for the target training task.

An embodiment of the present disclosure further provides an electronic device, including a processor, a memory, and a computer program stored on the memory and capable of running on the processor, the computer program, when executed by the processor, implements the method of resource allocation described above.

An embodiment of the present disclosure further provides a non-transitory computer-readable storage medium, a computer program is stored on the non-transitory computer-readable storage medium, and the computer program, when executed by a processor, implements the method of resource allocation described above.

Embodiments of the present disclosure have the following advantages:

In this embodiment of the present disclosure, when it is detected that the target training task in the target development environment is started, the loading of the client plugin library will be triggered. Therefore, the client plugin library may redirect the loading process of the target deep learning framework for the target training task, to hijack the startup process of the deep learning framework, and a target graphics processing unit request is generated during this process to request the allocation of graphics processing unit resources for the target training task. Compared to the prior art, this embodiment of the present disclosure starts from the perspective of the deep learning framework, analyzes the loading logic of the deep learning framework when the training task is started, and achieves dynamic graphics processing unit sharing through hijacking the framework. The method is simple to implement and does not require modification of the framework, and users are unaware of it when using it. It is as flexible as the default graphics processing unit sharing mode. And based on the dynamic sharing logic of the graphics processing units, the graphics processing unit resources are unbound from the development environment, and the graphics processing unit resources are allocated only when the user actually starts the training task, thus solving the problem of users idly occupying graphics processing unit resources under the pre-allocation mode, efficiently utilizing graphics processing unit resources of the node, and improving the overall utilization rate of graphics processing unit resources of the node.

BRIEF DESCRIPTION OF THE DRAWINGS

In order to more clearly illustrate the technical solutions of the present disclosure, the figures that are required to describe the present disclosure will be briefly introduced below. Apparently, the figures that are described below are merely some embodiments of the present disclosure, and a person skilled in the art may obtain other figures according to these figures without paying creative work.

DETAILED DESCRIPTION

In order to make the above objectives, features, and advantages of the present disclosure more obvious and understandable, the following will provide further detailed explanations of the present disclosure in conjunction with the accompanying drawings and detailed description. Obviously, the described embodiments are a part of the embodiments of the present disclosure, rather than the entire embodiments. Based on the embodiments in the present disclosure, all other embodiments obtained by persons skilled in the art without creative work are within the scope of protection of the present disclosure.

In order to improve the utilization of graphics processing unit resources, the embodiment of the present disclosure provides a method of resource allocation that may be applied to an artificial intelligence training system. The artificial intelligence training system may be used for task training, such as training of image recognition.

The artificial intelligence training system may include a client plugin library and at least one node, a plurality of development environments are created in each node. The client plugin library may be used to request graphics processing unit resources and keep tasks alive, and so on.

When it is detected that a target training task in a target development environment is started, it will trigger the loading of the client plugin library. Therefore, the client plugin library may redirect the loading process of the target deep learning framework for the target training task, to hijack the startup process of the deep learning framework, and generate a target graphics processing unit request during this process to request the allocation of the graphics processing unit resources for the target training task.

Compared to the prior art, this embodiment of the present disclosure starts from the perspective of the deep learning framework, analyzes the loading logic of the deep learning framework when the training task is started, and achieves dynamic graphics processing unit sharing through hijacking the framework. The method is simple to implement and does not require modification of the framework, and users are unaware of it when using it. It is as flexible as the default graphics processing unit sharing mode.

And based on the dynamic sharing logic of the graphics processing units, the graphics processing unit resources are unbound from the development environment, and the graphics processing unit resources are allocated only when the user actually starts the training task, thus solving the problem of users idly occupying graphics processing unit resources under the pre-allocation mode, efficiently utilizing graphics processing unit resources of the node, and improving the overall utilization rate of graphics processing unit resources of the node.

Figure 1:
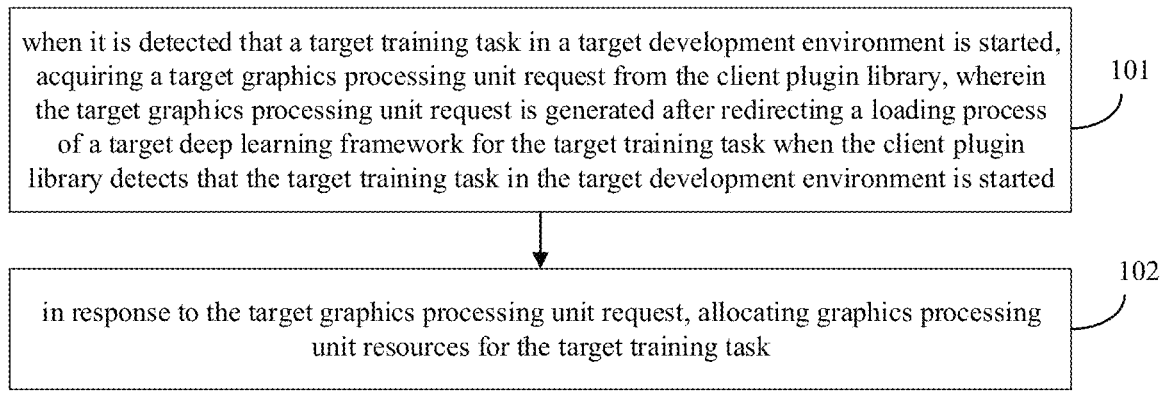
FIG. 1 is a flow chart of steps of a method of resource allocation according to an embodiment of the present disclosure.

Referring to FIG. 1, a flow chart of steps of a method of resource allocation according to an embodiment of the present disclosure is shown. The method may be applied to an artificial intelligence training system, the artificial intelligence training system may include a client plugin library and at least one node, a plurality of development environments are created in each node.

In some embodiments, the method may include the following steps:

Step 101, when it is detected that a target training task in a target development environment is started, acquiring a target graphics processing unit request from the client plugin library; among them, the target graphics processing unit request is generated after redirecting a loading process of a target deep learning framework for the target training task when the client plugin library detects that the target training task in the target development environment is started.

Among them, the client plugin library may be set according to the actual situation, and it may be used to request graphics processing unit resources and keep tasks alive, as well as for other functions such as sending training task completion messages. This embodiment of the present disclosure does not limit this.

The target training task may be a training task initiated by the user in the target development environment, such as a training task for image recognition.

The target deep learning framework may be a deep learning framework selected by the users based on their demands, such as caffe (a deep learning framework written in C++ language), TensorFlow (a deep learning framework designed entirely based on Python as an open-source software), pytorch (a feature-complete framework for building deep learning models, a machine learning commonly used for applications such as image recognition and language processing), mxnet (an open-source deep learning framework that allows users to define, train, and deploy deep neural networks on multiple devices (whether cloud infrastructure or mobile devices)), etc. This embodiment of the present disclosure does not limit this.

In practical applications, in order to improve the overall utilization of graphics processing unit resources of the node, a client plugin library may be disposed in the artificial intelligence training system. When it is detected that the target training task in the target development environment is started, it will trigger the loading of the client plugin library.

At this point, the client plugin library may redirect the loading process of the target deep learning framework and generate a corresponding target graphics processing unit request.

In some embodiments of the present disclosure, the target graphics processing unit request may include graphics processing unit resources required for the target training task, identification of the target development environment, etc., which are not limited in the embodiments of the present disclosure.

After generating the target graphics processing unit request, the client plugin library may send it to the node manager in the artificial intelligence training system. The node manager may be used for allocating the graphics processing unit resources.

Step 102, in response to the target graphics processing unit request, allocating graphics processing unit resources for the target training task.

After receiving the target graphics processing unit request, the node manager may allocate the graphics processing unit resources for the target training task in response to the target graphics processing unit request. For example, the graphics processing units to be allocated to the target training task for using and the number of the graphics processing units, as well as the memory capacity to be allocated to the target training task for using, which are not limited in the embodiments of this application.

Thus, the graphics processing unit resources are allocated only when the user actually starts the training task, thus solving the problem of users idly occupying graphics processing unit resources under the pre-allocation mode, efficiently utilizing graphics processing unit resources of the node, and improving the overall utilization rate of graphics processing unit resources of the node.

In some embodiments of the present disclosure, after allocating the graphics processing unit resources to the target training task, the target deep learning framework may use a node manager to allocate the graphics processing unit resources to the target training task for artificial intelligence training.

In some embodiments of the present disclosure, when it is detected that a target training task in a target development environment is started, it will trigger the loading of the client plugin library. Therefore, the client plugin library may redirect the loading process of the target deep learning framework for the target training task, to hijack the startup process of the deep learning framework, and generate a target graphics processing unit request during this process to request the allocation of the graphics processing unit resources for the target training task. Compared to the prior art, this embodiment of the present disclosure starts from the perspective of the deep learning framework, analyzes the loading logic of the deep learning framework when the training task is started, and achieves dynamic graphics processing unit sharing through hijacking the framework. The method is simple to implement and does not require modification of the framework, and users are unaware of it when using it. It is as flexible as the default graphics processing unit sharing mode. And based on the dynamic sharing logic of the graphics processing units, the graphics processing unit resources are unbound from the development environment, and the graphics processing unit resources are allocated only when the user actually starts the training task, thus solving the problem of users idly occupying graphics processing unit resources under the pre-allocation mode, efficiently utilizing graphics processing unit resources of the node, and improving the overall utilization rate of graphics processing unit resources of the node.

Figure 2:
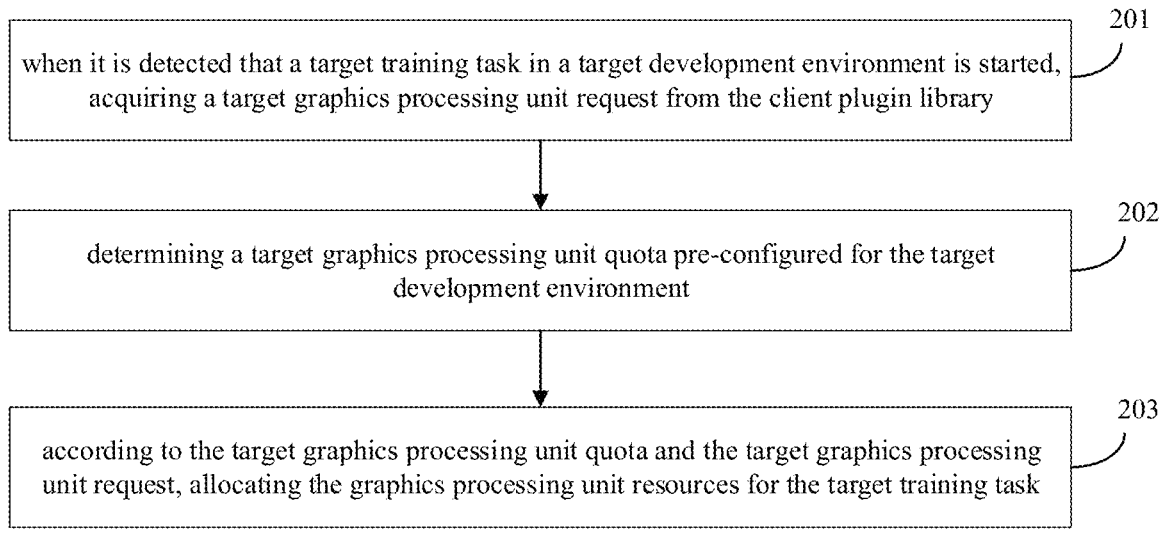
FIG. 2 is another flow chart of steps of a method of resource allocation according to an embodiment of the present disclosure.

Referring to FIG. 2, another flow chart of steps of a method of resource allocation according to an embodiment of the present disclosure is shown, and the method may include the following steps:

Step 201, when it is detected that a target training task in a target development environment is started, acquiring a target graphics processing unit request from the client plugin library.

In practical applications, in order to improve the overall utilization of graphics processing unit resources of the node, a client plugin library may be disposed in the artificial intelligence training system. When it is detected that the target training task in the target development environment is started, it will trigger the loading of the client plugin library.

At this point, the client plugin library may redirect the loading process of the target deep learning framework and generate a corresponding target graphics processing unit request.

After generating the target graphics processing unit request, the client plugin library may send it to the node manager in the artificial intelligence training system.

Step 202, determining a target graphics processing unit quota pre-configured for the target development environment.

Among them, the graphics processing unit quota may be a maximum available graphics processing unit resource of the development environment configured by a user for the target development environment in advance. For example, the number of the maximum available graphics processing units, the size of the memory, etc., which are not limited by the embodiments of the present disclosure.

In some embodiments of the present disclosure, the graphics processing unit quotas input by the user for various development environments may be received in advance.

In practical applications, one of the prerequisites for scheduling the graphics processing units is to know the graphics processing unit resources required for the training tasks, such as the number of the graphics processing units and the size of the memory. However, when the training task is started, this type of information may not be known to the node manager, especially the required graphics processing unit memory size.

Based on this, it may receive the graphics processing unit quotas input by the user for the development environment when creating the development environment. Then, the node manager may store the graphics processing unit quotas, so that when it is necessary to allocate the graphics processing unit resources for the target training task in the target development environment in the future, the node manager may also allocate the graphics processing unit resources based on the graphics processing unit quotas pre-configured for the development environment.

Step 203, according to the target graphics processing unit quota and the target graphics processing unit request, allocating the graphics processing unit resources for the target training task.

After obtaining the target graphics processing unit quota for the target development environment and the target graphics processing unit request, the graphics processing unit resources may be allocated for the target training task based on the target graphics processing unit quota and the target graphics processing unit request.

For example, if the target graphics processing unit request includes information about the graphics processing unit resources required for the target training task, the graphics processing unit resources may be allocated directly for the target training task based on the target graphics processing unit request. However, it should be noted that if the graphics processing unit resources required for the target training task exceed the target graphics processing unit quota, it may indicate that the target development environment is unable to perform the target training task. At this time, the scheduling failure information may be generated and returned to the user.

If the target graphics processing unit request does not include the information about the graphics processing unit resources required for the target training task, the graphics processing unit resources may be allocated for the target training task based on the target graphics processing unit quota, this embodiment of the present disclosure does not limit this.

In one embodiment of the present disclosure, the target node corresponding to the target development environment may be deployed with corresponding graphics processing unit resources (e.g. deployed with 3 graphics processing units and a memory size of 5G), and the target graphics processing unit quota includes the number of the target graphics processing unit quotas. When allocating the graphics processing unit resources for the target training task based on the target graphics processing unit quota and the target graphics processing unit request, the allocation process may be achieved through the following sub steps:

Sub step 11, determining a number of graphics processing units currently used by the target development environment.

In practical applications, the target development environment may not only be performing the target training task, but may also be performing other training tasks. At this point, the number of the graphics processing units already used by the target development environment may be determined first, which is the number of the graphics processing units used by the training tasks currently underway in the target development environment.

Sub step 12, in response to the number of the graphics processing units currently used being less than the number of the target graphics processing unit quotas, allocating the graphics processing unit resources for the target training task from graphics processing units not currently used by the target development environment in the graphics processing unit resources corresponding to the target node.

After the number of the graphics processing units currently used by the target development environment is determined, it may compare its size with the number of the target graphics processing unit quotas. If the number of the graphics processing units currently used is less than the number of the target graphics processing unit quotas, it may indicate that there is still a remaining quota for the number of the graphics processing units for the target development node.

At this point, the graphics processing unit resources may be allocated for the target training task from the graphics processing units not currently used by the target development environment in the graphics processing unit resources corresponding to the target node, so that the target training task may use a new graphics processing unit for training.

In some embodiments of the present disclosure, the allocation process of sub step 12 may be implemented through the following steps:

determining a current number of tasks of the graphics processing units not currently used by the target development environment, and determining a number of graphics processing units with the current number of tasks less than a task threshold; in response to the number of the graphics processing units with the current number of tasks less than the task threshold being less than a number of graphics processing units required for the target training task, allocating the graphics processing unit resources for the target training task from the graphics processing units with the current number of tasks less than the task threshold and the graphics processing units currently used by the target development environment. In response to the number of the graphics processing units with the current number of tasks less than the task threshold being not less than the number of the graphics processing units required for the target training task, allocating the graphics processing unit resources for the target training task from the graphics processing units with the current number of tasks less than the task threshold.

In some embodiments, the current number of tasks of the graphics processing units not currently used by the target development environment may be determined first, and the number of the graphics processing units with the current number of tasks less than the task threshold is determined. Then, the number of the graphics processing units with the current number of tasks less than the task threshold may be compared with the number of the graphics processing units required for the target training task. Among them, the task threshold may be set according to the actual situation, and this embodiment of the present disclosure does not limit it.

If the number of the graphics processing units with the current number of tasks less than the task threshold is less than the number of the graphics processing units required for the target training task, it may indicate that the graphics processing units not used by the target development environment cannot meet the demand for the graphics processing unit resources for the target training task.

At this point, the graphics processing unit resources may be allocated for the target training task from the graphics processing units with the current number of tasks less than the task threshold and the graphics processing units currently used by the target development environment, respectively, to complete the target training task as much as possible through multiple graphics processing units.

If the number of the graphics processing units with the current number of tasks less than the task threshold is not less than the number of the graphics processing units required for the target training task, it may indicate that the graphics processing units not used by the target development environment may meet the demand for the graphics processing unit resources for the target training task.

At this point, the graphics processing unit resources may be allocated for the target training task from the graphics processing units with the current number of tasks less than the task threshold, to allocate new graphics processing units to the target training task.

Sub step 13, in response to the number of the graphics processing units currently used being equal to the number of the target graphics processing unit quotas, allocating the graphics processing unit resources for the target training task from the graphics processing units currently used by the target development environment.

If the number of the graphics processing units currently used is equal to the number of the target graphics processing unit quotas, it may indicate that there is no remaining quota for the number of the graphics processing units for the target development node.

At this point, the graphics processing unit resources may be allocated for the target training task from the graphics processing units currently used by the target development environment.

In some embodiments of the present disclosure, the allocation process of sub step 13 may be implemented through the following steps:

determining a number of graphics processing units required for the target training task; in response to the number of the graphics processing units required being greater than the number of the graphics processing units currently used, generating scheduling failure information; and in response to the number of the graphics processing units required being not greater than the number of the graphics processing units currently used, sorting the graphics processing units currently used by the target development environment according to a number of tasks, and allocating the graphics processing unit resources for the target training task from top N graphics processing units with a minimum number of tasks of the graphics processing units currently used by the target development environment; among them, N is the number of the graphics processing units required for the target training task.

In some embodiments, the number of graphics processing units required for the target training task may be determined first; then, the size relationship between the number of the graphics processing units required for the target training task and the number of the graphics processing units currently used by the target development environment is compared.

If the number of the graphics processing units required for the target training task is greater than the number of the graphics processing units currently used by the target development environment, it may indicate that the target development environment cannot meet the demand for the graphics processing unit resources for the target training task.

At this point, the scheduling failure information is generated and sent to the user.

If the number of the graphics processing units required for the target training task is not greater than the number of the graphics processing units currently used by the target development environment, it may indicate that the target development environment may meet the demand for the graphics processing unit resources for the target training task.

At this point, the graphics processing units currently used by the target development environment may be sorted according to the number of tasks, and the graphics processing unit resources may be allocated for the target training task from the top N graphics processing units with the minimum number of tasks of the graphics processing units currently used by the target development environment.

Among them, N may refer to the number of the graphics processing units required for the target training task.

In some embodiments of the present disclosure, when allocating the graphics processing unit resources for the target training task from the graphics processing units with the current number of tasks less than the task threshold and the graphics processing units currently used by the target development environment, the allocation process may be performed through the following steps:

according to the number of the graphics processing units required for the target training task and a number of the graphics processing units not currently used by the target development environment in the graphics processing unit resources corresponding to the target node, determining a number of reused graphics processing units; in response to the number of the graphics processing units currently used being less than the number of the reused graphics processing units, generating scheduling failure information; and in response to the number of the graphics processing units currently used being not less than the number of the reused graphics processing units, allocating the graphics processing unit resources for the target training task from top M graphics processing units with a minimum number of tasks of the graphics processing units currently used by the target development environment and the graphics processing units with the current number of tasks less than task threshold; among them, M is the number of the reused graphics processing units.

In some embodiments, the number of graphics processing units that need to be reused may be determined first according to the number of the graphics processing units required for the target training task and the number of the graphics processing units not currently used by the target development environment in the graphics processing unit resources corresponding to the target node. For example, the number of the graphics processing units that need to be reused may be obtained by subtracting the number of the graphics processing units not currently used by the target development environment in the graphics processing unit resources corresponding to the target node from the number of the graphics processing units required for the target training task.

Then, the size relationship between the number of the graphics processing units that need to be reused and the number of the graphics processing units currently used by the target development environment may be compared.

If the number of the graphics processing units currently used by the target development environment is less than the number of the graphics processing units that need to be reused, it may indicate that the target development environment is unable to perform the target training task. At this point, the scheduling failure information may be generated and sent to the user.

If the number of the graphics processing units currently used by the target development environment is not less than the number of the graphics processing units that need to be reused, it may indicate that after allocating a new graphics processing unit, the target training task may be performed.

In some embodiments, the top M graphics processing units with the minimum number of tasks of the graphics processing units currently used by the target development environment may be determined first; then, the graphics processing unit resources may be allocated for the target training task from top M graphics processing units with the minimum number of tasks of the graphics processing units currently used by the target development environment and the graphics processing units with the current number of tasks less than task threshold.

In practical applications, for the allocation process, it may also generate and store allocation information for the graphics processing unit resources for each development environment, so that the node manager may determine the allocation of graphics processing units for each development environment based on the allocation information.

Figure 3:
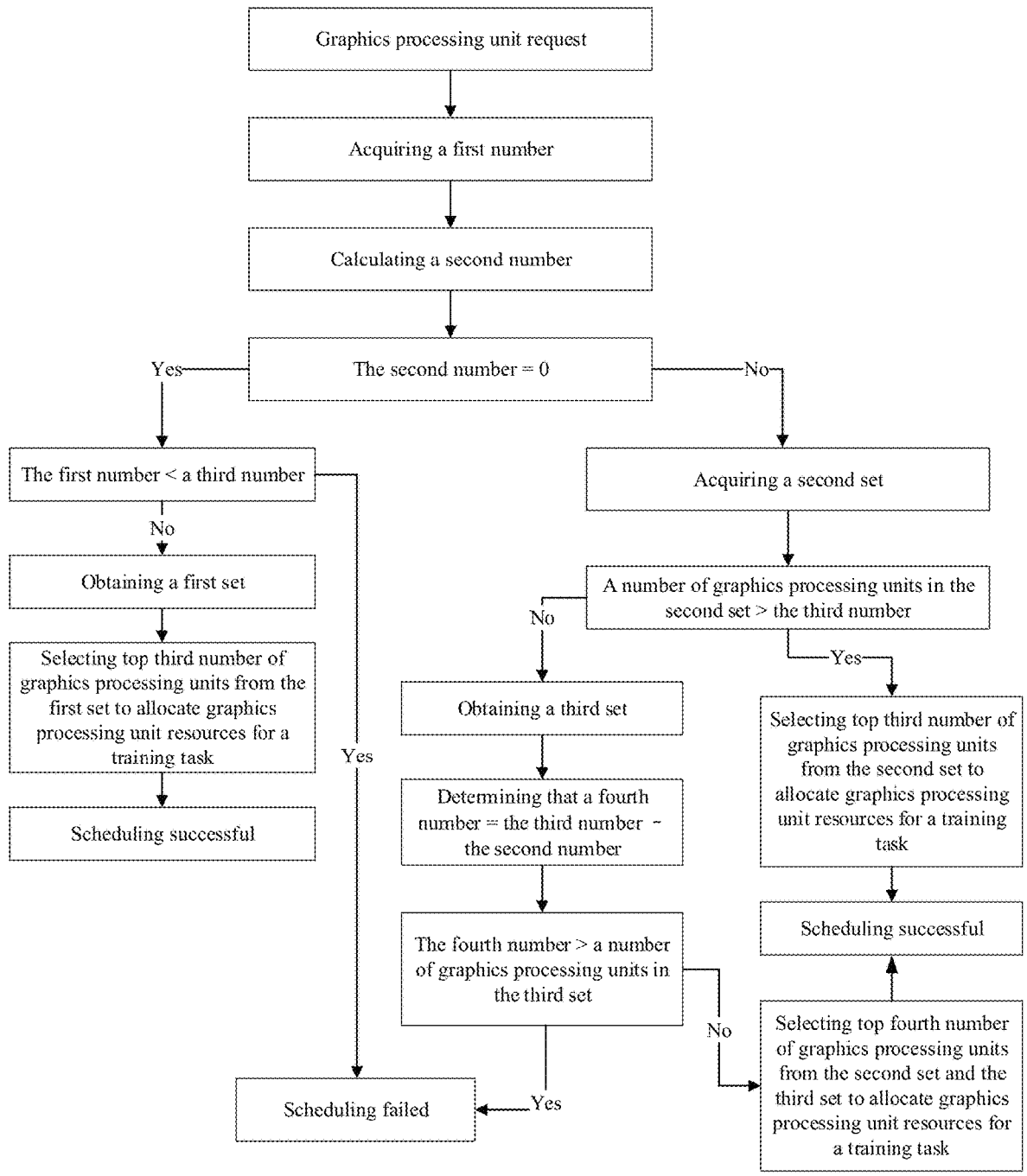
FIG. 3 is a flow chart of steps for scheduling graphics processing units in an embodiment of the present disclosure.

As shown in FIG. 3, a flow chart of the steps for scheduling the graphics processing unit in an embodiment of the present application is shown.

When processing the graphics processing unit request, the number of the graphics processing units currently used by the development environment is acquired first, denoted as a first number. Then, based on the quota of the development environment, a number of new graphics processing units currently usable in the development environment is calculated (denoted as a second number)=the quota of the development environment−the first number.

If the second number is 0, it may be further determined whether the first number is less than the number of the graphics processing units required for the training task (denoted as the third number). If the first number is less than the third number, the scheduling fails. If the first number is not less than the third number, the graphics processing units currently used by the target development environment are sorted in ascending order of the number of tasks, and a first set is obtained. Then, the top third number of graphics processing units is selected from the first set to allocate the graphics processing unit resources for the training task. At this point, the scheduling is successful.

If the second number is not equal to 0, the top second number of new graphics processing units that meet the condition (the current number of tasks is less than the task threshold) may be obtained, denoted as a second set. If the number of the graphics processing units in the second set is greater than the third number, the top third number of graphics processing units are directly selected from the second set to allocate the graphics processing unit resources for the training task. At this point, the scheduling is successful. If the number of the graphics processing units in the second set is not greater than the third number, the graphics processing unit resources are allocated for the training task from the graphics processing units with the current number of tasks less than the task threshold and the graphics processing units currently used by the development environment.

In some embodiments, the graphics processing units currently used by the target development environment may be sorted in ascending order of the number of tasks, to obtain a third set. Then, based on the number of the graphics processing units required for the training task and the number of the graphics processing units not currently used by the development environment in the graphics processing unit resources corresponding to the node, it is determined that the number of reused graphics processing units (denoted as the fourth number)=the third number−the second number.

If the fourth number is greater than the number of graphics processing units in the third set, the scheduling fails; If the fourth number is not greater than the number of the graphics processing units in the third set, the graphics processing unit resources are allocated for the training task from the top fourth number of the graphics processing units in the second set and the third set.

In another embodiment of the present application, the target graphics processing unit quota further includes a target graphics processing unit memory quota capacity, and the target graphics processing unit memory quota capacity may be input by the user in advance.

When allocating the graphics processing unit resources for the target training tasks based on the target graphics processing unit quotas and the target graphics processing unit request, the following sub step may also be included:

Sub step 21, according to the target graphics processing unit memory quota capacity, allocating a graphics processing unit memory capacity for the target training task.

In practical applications, the graphics processing unit memory capacity required for the target training task is difficult to know. Therefore, when allocating the graphics processing unit memory capacity for the target training task, the graphics processing unit memory capacity may be directly allocated based on the target graphics processing unit memory quota capacity.

In order to avoid duplicate allocation, in one embodiment of the present disclosure, when allocating the graphics processing unit memory capacity for the target training task based on the target graphics processing unit memory quota capacity, the allocation process may be achieved through the following steps:

determining whether any other training task is in the target development environment when starting the target training task; in response to no other training task being in the target development environment, according to the target graphics processing unit memory quota capacity, allocating the graphics processing unit memory capacity for the target training task; and in response to another training task being in the target development environment, determining a remaining graphics processing unit memory quota capacity of the target development environment according to the target training task, and updating the allocation information according to the remaining graphics processing unit memory quota capacity of the target development environment.

When allocating the graphics processing unit memory capacity for the target training task, it may first determine whether any other training task is in the target development environment.

If there is no other training task in the target development environment when starting the target training task, the graphics processing unit memory capacity may be allocated directly for the target training task according to the target graphics processing unit memory quota capacity.

If there is another training task in the target development environment when starting the target training task, since the allocation is directly performed based on the target graphics processing unit memory quota capacity, which is the maximum graphics processing unit memory capacity that the target development environment is capable to use, and it cannot be reallocated.

At this point, a new graphics processing unit memory capacity may no longer be allocated for the target training task, but the graphics processing unit memory capacity already allocated to the target development environment may be directly invoked to run the target training task.

In some embodiments of the present disclosure, the graphics processing unit memory capacity of the target development environment is constant. Therefore, after allocating the graphics processing unit memory capacity of the target development environment for the target training task, the remaining graphics processing unit memory quota capacity of the target development environment may be determined according to the target training task, and the allocation information may be updated according to the remaining graphics processing unit memory quota capacity of the target development environment.

Then, when the target development environment initiates a new training task subsequently, the remaining graphics processing unit memory quota capacity of the target development environment may be determined first based on the allocation information, and whether the target development environment is capable to run the new training task normally may be determined based on the remaining graphics processing unit memory quota capacity.

Figure 4:
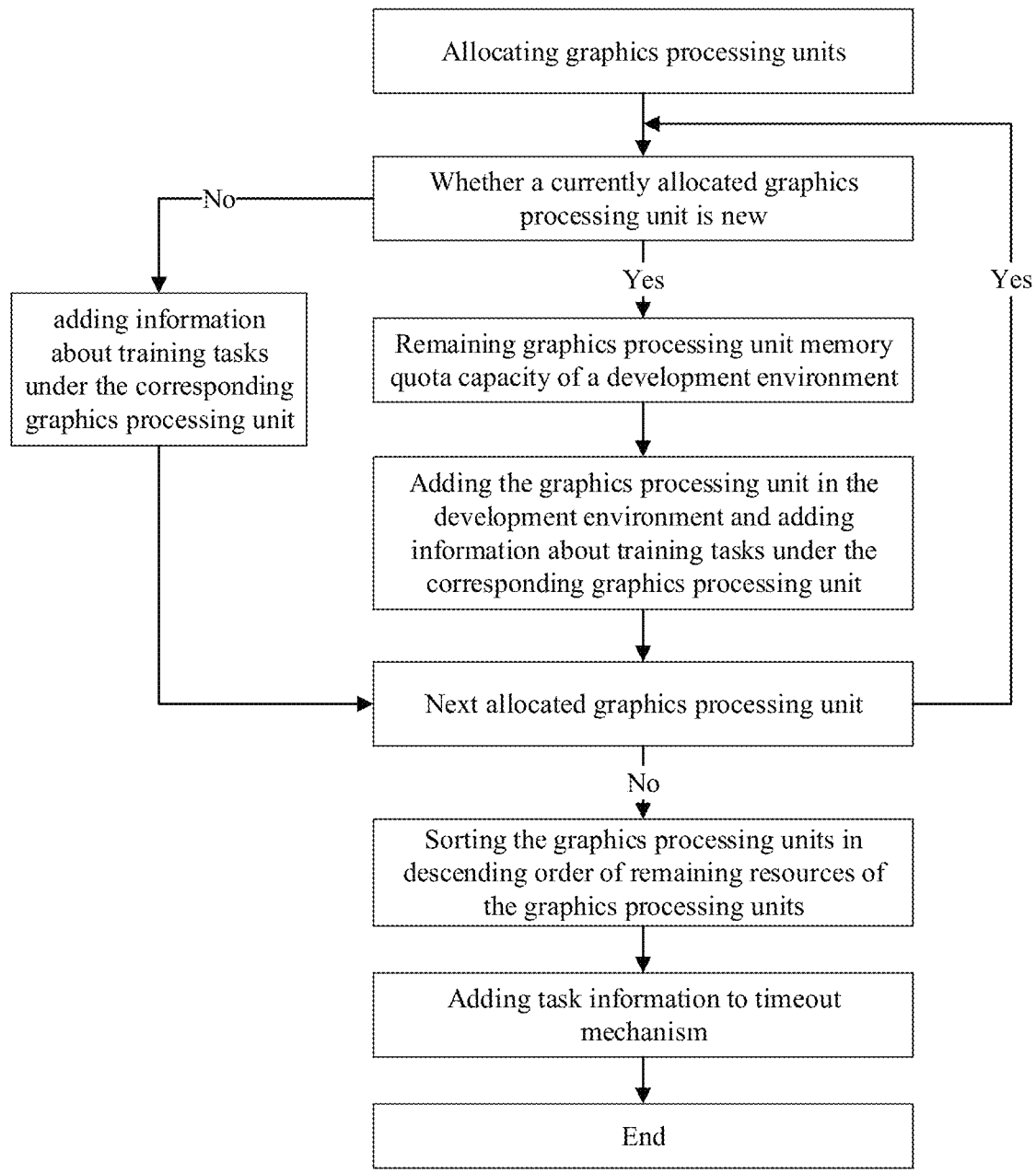
FIG. 4 is another flow chart of steps for scheduling graphics processing units according to an embodiment of the present disclosure.

As shown in FIG. 4, when allocating the graphics processing units, it is determined that whether the currently allocated graphics processing unit is new. If so, the remaining graphics processing unit memory quota capacity of the development environment is obtained based on the graphics processing unit memory quota capacity corresponding to the development environment and the currently scheduled graphics processing unit memory capacity, the graphics processing unit is added to the development environment, and information about the training task is added under the corresponding graphics processing unit.

If it is not new, the information about the training task is added under the corresponding graphics processing unit.

Then, it continues to determine whether the next allocated graphics processing unit is new until there are no more allocated graphics processing units left. At this point, the graphics processing units may be sorted in descending order of the remaining resources of the graphics processing units, and task information may be added to the timeout mechanism to determine whether the training task has timed out.

In order to ensure the effective recycling of the graphics processing unit resources for use by other development environments/training tasks, in one embodiment of the present disclosure, one or more of the following steps for recycling the graphics processing unit resources may also be included:

the first method is to recycle the graphics processing unit resources allocated for the target training task when it is detected that the target training task is ended.

In practical applications, if it is detected that the target training task is ended, the graphics processing unit resources allocated for the target training task may be recycled. At the same time, the allocation information corresponding to the target development environment may be updated.

The second method is to recycle the graphics processing unit resources allocated for the target training task when no heartbeat information for the target training task is received within the preset period.

When the client plugin library detects that the target training task has started running, it may send the heartbeat information for the target training task to the node manager according to the preset cycle.

If the node manager does not receive the heartbeat information for the target training task within the preset period, it may indicate that the target training task may have encountered an abnormality, and the graphics processing unit resources allocated for the target training task may be recycled at this time. At the same time, the allocation information corresponding to the target development environment may be updated.

Figure 5:
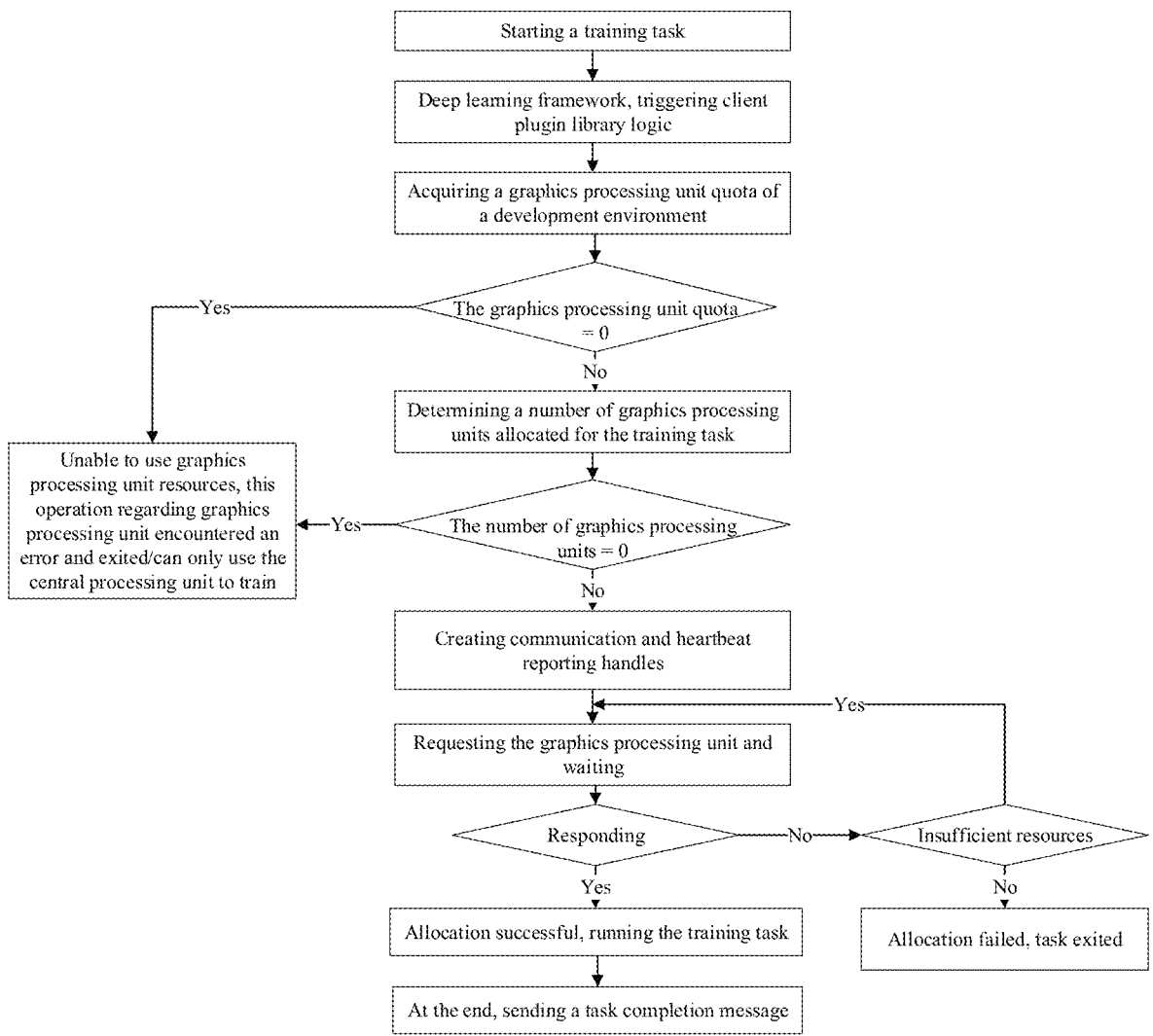
FIG. 5 is yet another flow chart for scheduling graphics processing units according to an embodiment of the present disclosure.

As shown in FIG. 5, another flow chart for scheduling the graphics processing units in the embodiment of the present disclosure is shown.

After starting the training task, the deep learning framework is run and the client plugin library logic is triggered. At this point, the graphics processing unit quota of the development environment may be acquired.

If the graphics processing unit quota is 0, it indicates that the training tasks in this development environment cannot use the graphics processing unit resources, and the operation regarding the graphics processing unit has encountered an error and exited. Alternatively, only the central processing unit may be used for training.

If the graphics processing unit quota is not 0, the number of the graphics processing units allocated for the training tasks may be determined.

If the number of the graphics processing units is 0, it indicates that the training task cannot use the graphics processing units, and the operation regarding the graphics processing units has encountered an error and exited. Alternatively, only the central processing unit may be used for training.

If the number of the graphics processing units is not 0, the client plugin library may create communication and heartbeat report handles with the node manager, request the graphics processing units from the node manager, and wait for the response by the node manager.

If the node manager responds, the allocation is successful, the training task is run, and a task completion message is sent to the node manager when the training task is ended.

If the node manager does not respond, it indicates allocation failure. At this point, it may determine whether the allocation failure is due to insufficient resources. If so, continue to request the graphics processing unit. If not, the allocation fails and the task exits.

In this embodiment of the present disclosure, when it is detected that the target training task in the target development environment is started, the target graphics processing unit request is acquired from the client plugin library; the target graphics processing unit quota pre-configured for the target development environment is determined; the graphics processing unit resources are allocated for the target training tasks based on the target graphics processing unit quota and the target graphics processing unit request. Based on the over-provisioning of the graphics processing unit resources of the node (i.e., pre-configuring graphics processing unit quotas for the development environment), the problem of user development environment idly occupying the graphics processing unit resources is solved, and the utilization rate of the graphics processing unit resources of the node is improved.

It should be noted that for the sake of simplicity, the method embodiments are described as a series of action combinations. However, those skilled in the art should be aware that the embodiments of the present disclosure are not limited by the order of the described actions, because according to the embodiments of the present disclosure, certain steps may be performed in other orders or simultaneously. Secondly, persons skilled in the art should also be aware that the embodiments described in the specification are all preferred embodiments, and the actions involved are not necessarily necessary for the embodiments of the present disclosure.

Figure 6:
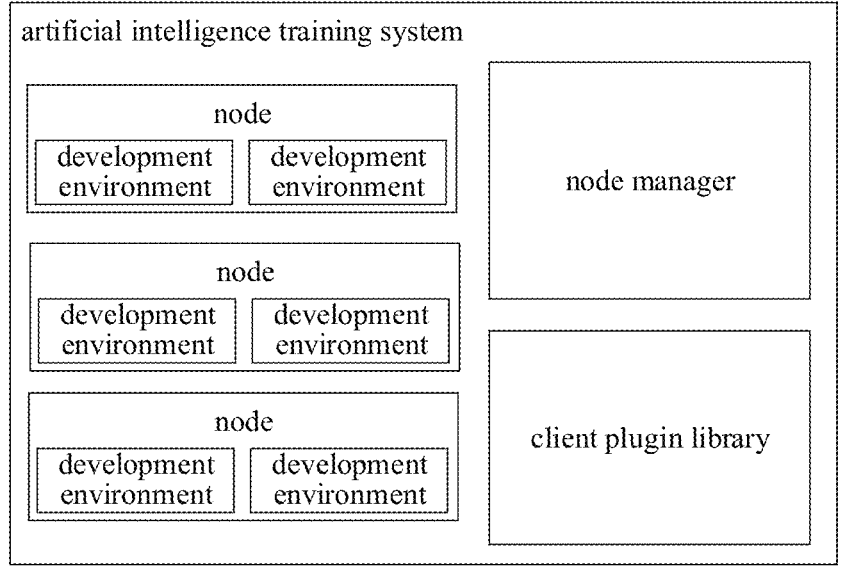
FIG. 6 is a schematic structural diagram of an artificial intelligence training system according to an embodiment of the present disclosure.

Referring to FIG. 6, a schematic structural diagram of an artificial intelligence training system according to an embodiment of the present disclosure is shown. The artificial intelligence training system may include at least one node, a node manager and a client plugin library, a plurality of development environments being created in each node.

The client plugin library is configured for, when detecting that a target training task in a target development environment is started, generating a target graphics processing unit request after redirecting a loading process of a target deep learning framework for the target training task, and sending the target graphics processing unit request to the node manager.

In practical applications, in order to improve the overall utilization of graphics processing unit resources of the node, a client plugin library may be disposed in the artificial intelligence training system. When it is detected that the target training task in the target development environment is started, it will trigger the loading of the client plugin library.

At this point, the client plugin library may redirect the loading process of the target deep learning framework and generate a corresponding target graphics processing unit request.

After generating the target graphics processing unit request, the client plugin library may send it to the node manager in the artificial intelligence training system.

In an embodiment of the present disclosure, the node manager is configured for, in response to the target graphics processing unit request, allocating graphics processing unit resources for the target training task.

After receiving the target graphics processing unit request, the node manager may allocate the graphics processing unit resources for the target training task in response to the target graphics processing unit request.

As an example, the node manager may also be configured for determining a target graphics processing unit quota pre-configured for the target development environment, and allocating the graphics processing unit resources for the target training task according to the target graphics processing unit quota and the target graphics processing unit request.

As another example, the node manager may include an auxiliary module; the auxiliary module is configured for recording an allocation process of the node manager. In some embodiments, for the allocation process, the auxiliary module may generate and store allocation information of the graphics processing unit resources for each development environment, so that the node manager may determine the allocation of the graphics processing units for each development environment based on the allocation information.

In one embodiment of the present disclosure, the target deep learning framework performs artificial intelligence training using the graphics processing unit resources allocated by the node manager.

After allocating the graphics processing unit resources for the target training task, the target deep learning framework may use a node manager to allocate the graphics processing unit resources for the target training task for performing artificial intelligence training.

In practical applications, one of the prerequisites for scheduling the graphics processing units is to know the graphics processing unit resources required for the training tasks, such as the number of the graphics processing units and the size of the memory. However, when the training task is started, this type of information may not be known to the node manager, especially the required graphics processing unit memory size.

Based on this, it may receive the graphics processing unit quotas input by the user for the development environment when creating the development environment. Then, the node manager may store the graphics processing unit quotas, so that when it is necessary to allocate the graphics processing unit resources for the target training task in the target development environment in the future, the node manager may also allocate the graphics processing unit resources based on the graphics processing unit quotas pre-configured for the development environment.

As an example, the node manager may include a graphics processing unit management module; the graphics processing unit management module is configured for storing a graphics processing unit quota input by a user for each of the plurality of development environments.

After obtaining the target graphics processing unit quota and the target graphics processing unit request for the target development environment, the node manager may allocate the graphics processing unit resources for the target training task based on the target graphics processing unit quota and the target graphics processing unit request.

If the target graphics processing unit request does not include information about the graphics processing unit resources required for the target training task, the node manager may allocate the graphics processing unit resources for the target training task based on the target graphics processing unit quota.

In one embodiment of the present disclosure, the target node corresponding to the target development environment is deployed with corresponding graphics processing unit resources, the target graphics processing unit quota includes a number of the target graphics processing unit quotas; the node manager is configured for determining a number of graphics processing units currently used by the target development environment; in response to the number of the graphics processing units currently used being less than the number of the target graphics processing unit quotas, allocating the graphics processing unit resources for the target training task from graphics processing units not currently used by the target development environment in the graphics processing unit resources corresponding to the target node; and in response to the number of the graphics processing units currently used being equal to the number of the target graphics processing unit quotas, allocating the graphics processing unit resources for the target training task from the graphics processing units currently used by the target development environment.

In practical applications, the target development environment may not only be performing the target training task, but may also be performing other training tasks. At this point, the node manager may first determine the number of the graphics processing units already used by the target development environment, that is, the number of the graphics processing units used by the training tasks currently underway in the target development environment.

After the number of the graphics processing units currently used by the target development environment is determined, the node manager may compare its size with the number of the target graphics processing unit quotas. If the number of the graphics processing units currently used is less than the number of the target graphics processing unit quotas, it may indicate that there is still a remaining quota for the number of the graphics processing units for the target development node.

At this point, the node manager may allocate the graphics processing unit resources for the target training task from the graphics processing units not currently used by the target development environment in the graphics processing unit resources corresponding to the target node, so that the target training task may use a new graphics processing unit for training.

In one embodiment of the present disclosure, the node manager is configured for determining a current number of tasks of the graphics processing units not currently used by the target development environment, and determining a number of graphics processing units with the current number of tasks less than a task threshold; if the number of the graphics processing units with the current number of tasks less than the task threshold is less than a number of graphics processing units required for the target training task, allocating the graphics processing unit resources for the target training task from the graphics processing units with the current number of tasks less than the task threshold and the graphics processing units currently used by the target development environment; and if the number of the graphics processing units with the current number of tasks less than the task threshold is not less than the number of the graphics processing units required for the target training task, allocating the graphics processing unit resources for the target training task from the graphics processing units with the current number of tasks less than the task threshold.

In practical applications, the node manager may determine the current number of tasks of the graphics processing units not currently used by the target development environment, and determine the number of the graphics processing units with the current number of tasks less than the task threshold; if the number of the graphics processing units with the current number of tasks less than the task threshold is less than the number of the graphics processing units required for the target training task, allocate the graphics processing unit resources for the target training task from the graphics processing units with the current number of tasks less than the task threshold and the graphics processing units currently used by the target development environment. If the number of the graphics processing units with the current number of tasks less than the task threshold is not less than the number of the graphics processing units required for the target training task, the node manager may allocate the graphics processing unit resources for the target training task from the graphics processing units with the current number of tasks less than the task threshold.

In some embodiments, the node manager may first determine the current number of tasks of the graphics processing units not currently used by the target development environment, and determine the number of the graphics processing units with the current number of tasks less than the task threshold. Then, the node manager may compare the number of the graphics processing units with the current number of tasks less than the task threshold with the number of the graphics processing units required for the target training task.

If the number of the graphics processing units with the current number of tasks less than the task threshold is less than the number of the graphics processing units required for the target training task, it may indicate that the graphics processing units not used by the target development environment cannot meet the demand for the graphics processing unit resources for the target training task.

At this point, the node manager may allocate the graphics processing unit resources for the target training task from the graphics processing units with the current number of tasks less than the task threshold and the graphics processing units currently used by the target development environment, respectively, to complete the target training task as much as possible through multiple graphics processing units.

If the number of the graphics processing units with the current number of tasks less than the task threshold is not less than the number of the graphics processing units required for the target training task, it may indicate that the graphics processing units not used by the target development environment may meet the demand for the graphics processing unit resources for the target training task.

At this point, the node manager may allocate the graphics processing unit resources for the target training task from the graphics processing units with the current number of tasks less than the task threshold, to allocate new graphics processing units to the target training task.

If the number of the graphics processing units currently used is equal to the number of the target graphics processing unit quotas, the node manager may allocate the graphics processing unit resources for the target training task from the graphics processing units currently used by the target development environment.

If the number of the graphics processing units currently used is equal to the number of the target graphics processing unit quotas, it may indicate that there is no remaining quota for the number of the graphics processing units for the target development node.

At this point, the node manager may allocate the graphics processing unit resources for the target training task from the graphics processing units currently used by the target development environment.

In one embodiment of the present disclosure, the node manager is configured for determining a number of graphics processing units required for the target training task; if the number of the graphics processing units required is greater than the number of the graphics processing units currently used, generating scheduling failure information; and if the number of the graphics processing units required is not greater than the number of the graphics processing units currently used, sorting the graphics processing units currently used by the target development environment according to a number of tasks, and allocating the graphics processing unit resources for the target training task from top N graphics processing units with a minimum number of tasks of the graphics processing units currently used by the target development environment; among them, N is the number of the graphics processing units required for the target training task.

In practical applications, the node manager may determine the number of the graphics processing units required for the target training task; if the number of the graphics processing units required is greater than the number of the graphics processing units currently used, generate scheduling failure information; and if the number of the graphics processing units required is not greater than the number of the graphics processing units currently used, according to the number of tasks, sort the graphics processing units currently used by the target development environment, and allocate the graphics processing unit resources for the target training task from the top N graphics processing units with the minimum number of tasks of the graphics processing units currently used by the target development environment; among them, N is the number of the graphics processing units required for the target training task.

In some embodiments, the node manager may first determine the number of graphics processing units required for the target training task; then, the size relationship between the number of the graphics processing units required for the target training task and the number of the graphics processing units currently used by the target development environment is compared.

If the number of the graphics processing units required for the target training task is greater than the number of the graphics processing units currently used by the target development environment, it may indicate that the target development environment cannot meet the demand for the graphics processing unit resources for the target training task.

At this point, the node manager may generate the scheduling failure information and send it to the user.

If the number of the graphics processing units required for the target training task is not greater than the number of the graphics processing units currently used by the target development environment, it may indicate that the target development environment may meet the demand for the graphics processing unit resources for the target training task.

At this point, the node manager may sort the graphics processing units currently used by the target development environment according to the number of tasks, and allocate the graphics processing unit resources for the target training task from the top N graphics processing units with the minimum number of tasks of the graphics processing units currently used by the target development environment. Among them, N may refer to the number of the graphics processing units required for the target training task.

In an embodiment of the present disclosure, the node manager is configured for, according to the number of the graphics processing units required for the target training task and a number of the graphics processing units not currently used by the target development environment in the graphics processing unit resources corresponding to the target node, determining a number of reused graphics processing units; if the number of the graphics processing units currently used is less than the number of the reused graphics processing units, generating scheduling failure information; and if the number of the graphics processing units currently used is not less than the number of the reused graphics processing units, allocating the graphics processing unit resources for the target training task from top M graphics processing units with a minimum number of tasks of the graphics processing units currently used by the target development environment and the graphics processing units with the current number of tasks less than task threshold; among them, M is the number of the reused graphics processing units.

In some embodiments, the node manager may first determine the number of graphics processing units that need to be reused according to the number of the graphics processing units required for the target training task and the number of the graphics processing units not currently used by the target development environment in the graphics processing unit resources corresponding to the target node. For example, the number of the graphics processing units that need to be reused may be obtained by subtracting the number of the graphics processing units not currently used by the target development environment in the graphics processing unit resources corresponding to the target node from the number of the graphics processing units required for the target training task.

Then, the node manager may compare the size relationship between the number of the graphics processing units that need to be reused and the number of the graphics processing units currently used by the target development environment.

If the number of the graphics processing units currently used by the target development environment is less than the number of the graphics processing units that need to be reused, it may indicate that the target development environment is unable to perform the target training task. At this point, the node manager may generate the scheduling failure information and send it to the user.

If the number of the graphics processing units currently used by the target development environment is not less than the number of the graphics processing units that need to be reused, it may indicate that after allocating a new graphics processing unit, the target training task may be performed.

In some embodiments, the node manager may first determine the top M graphics processing units with the minimum number of tasks of the graphics processing units currently used by the target development environment; then, the node manager may allocate the graphics processing unit resources for the target training task from the top M graphics processing units with the minimum number of tasks of the graphics processing units currently used by the target development environment and the graphics processing units with the current number of tasks less than task threshold.

In an embodiment of the present disclosure, the node manager may include an auxiliary module; the auxiliary module is configured for recording an allocation process of the node manager, and generating and storing allocation information of the graphics processing unit resources for each of the plurality of development environments.

In some embodiments, for the allocation process, the auxiliary module may generate and store allocation information of the graphics processing unit resources for each development environment, so that the node manager may determine the allocation of the graphics processing units for each development environment based on the allocation information.

In an embodiment of the present disclosure, the target graphics processing unit quota further includes a target graphics processing unit memory quota capacity, and the target graphics processing unit memory quota capacity may be input by the user in advance. The node manager is further configured for, according to the target graphics processing unit memory quota capacity, allocating a graphics processing unit memory capacity for the target training task.

In practical applications, when allocating the graphics processing unit resources for the target training tasks based on the target graphics processing unit quotas and the target graphics processing unit request, the following sub steps may also be included: according to the target graphics processing unit memory quota capacity, allocating the graphics processing unit memory capacity for the target training task.

In practical applications, the graphics processing unit memory capacity required for the target training task is difficult to know. Therefore, when allocating the graphics processing unit memory capacity for the target training task, the graphics processing unit memory capacity may be directly allocated based on the target graphics processing unit memory quota capacity.

In order to avoid duplicate allocation, in one embodiment of the present disclosure, when allocating the graphics processing unit memory capacity for the target training task based on the target graphics processing unit memory quota capacity, the allocation process may be achieved through the following steps.

In one embodiment of the present disclosure, the node manager is configured for determining whether any other training task is in the target development environment when starting the target training task; if there is no other training task in the target development environment, according to the target graphics processing unit memory quota capacity, allocating the graphics processing unit memory capacity for the target training task; and if there is another training task in the target development environment, determining a remaining graphics processing unit memory quota capacity of the target development environment according to the target training task, and updating the allocation information according to the remaining graphics processing unit memory quota capacity of the target development environment.

In practical applications, the node manager determines whether any other training task is in the target development environment when starting the target training task; if there is no other training task in the target development environment, according to the target graphics processing unit memory quota capacity, the node manager allocates the graphics processing unit memory capacity for the target training task; and if there is another training task in the target development environment, the node manager determines the remaining graphics processing unit memory quota capacity of the target development environment according to the target training task, and updates the allocation information according to the remaining graphics processing unit memory quota capacity of the target development environment.

When allocating the graphics processing unit memory capacity for the target training task, the node manager may first determine whether any other training task is in the target development environment.

If there is no other training task in the target development environment when starting the target training task, the node manager may directly allocate the graphics processing unit memory capacity for the target training task according to the target graphics processing unit memory quota capacity.

If there is another training task in the target development environment when starting the target training task, since the allocation is directly performed based on the target graphics processing unit memory quota capacity, which is the maximum graphics processing unit memory capacity that the target development environment is capable to use, and it cannot be reallocated.

At this point, the node manager may no longer allocate a new graphics processing unit memory capacity for the target training task, but directly invoke the graphics processing unit memory capacity already allocated to the target development environment to run the target training task.

In an embodiment of the present disclosure, the graphics processing unit memory capacity of the target development environment is constant. Therefore, after allocating the graphics processing unit memory capacity of the target development environment for the target training task, the remaining graphics processing unit memory quota capacity of the target development environment may be determined according to the target training task, and the allocation information may be updated according to the remaining graphics processing unit memory quota capacity of the target development environment.

Then, when the target development environment initiates a new training task subsequently, the node manager may first determine the remaining graphics processing unit memory quota capacity of the target development environment based on the allocation information, and determine whether the target development environment is capable to run the new training task normally based on the remaining graphics processing unit memory quota capacity.

In order to ensure the effective recycling of the graphics processing unit resources for use by other development environments/training tasks, in one embodiment of the present disclosure, the node manager is further configured for recycling the graphics processing unit resources allocated for the target training task when it is detected that the target training task is ended.

In practical applications, if it is detected that the target training task is ended, the node manager may recycle the graphics processing unit resources allocated for the target training task. At the same time, the auxiliary module may update the allocation information corresponding to the target development environment.

In another embodiment of the present disclosure, the node manager is further configured for recycling the graphics processing unit resources allocated for the target training task when no heartbeat information for the target training task is received within the preset period.

When the client plugin library detects that the target training task has started running, it may send the heartbeat information for the target training task to the node manager according to the preset cycle.

If the node manager does not receive the heartbeat information for the target training task within the preset period, it may indicate that the target training task may have encountered an abnormality, and the graphics processing unit resources allocated for the target training task may be recycled at this time. At the same time, the allocation information corresponding to the target development environment may be updated.

Figure 7:
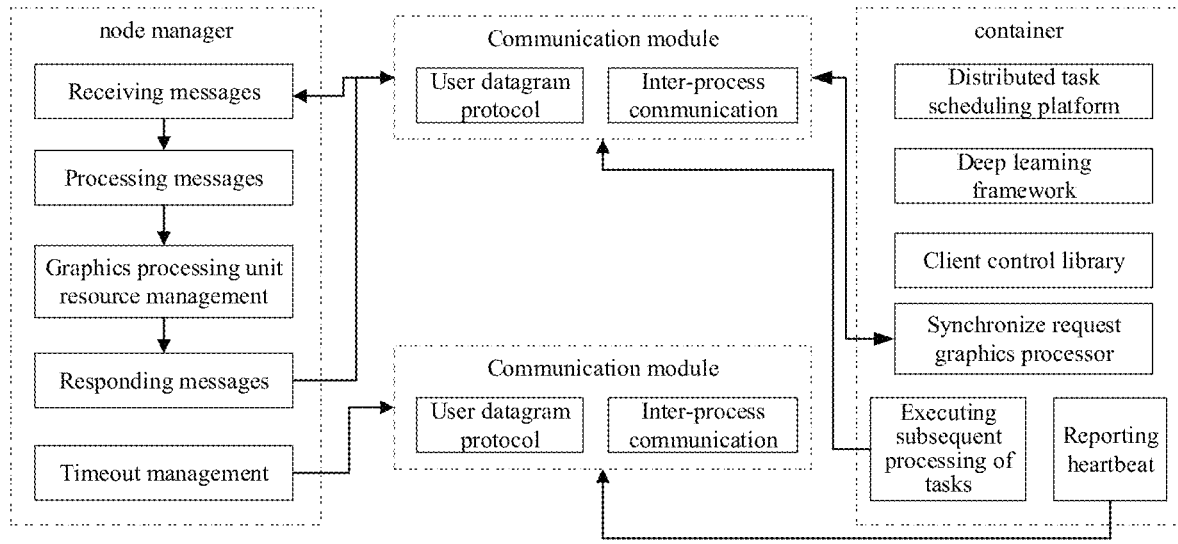
FIG. 7 is a schematic diagram of a partial structure of an artificial intelligence training system according to an embodiment of the present disclosure.

As shown in FIG. 7, schematic diagram of a partial structure of an artificial intelligence training system according to an embodiment of the present disclosure is shown:

The node manager and container (development environment) communicate through a communication module. The two may communicate through UDP (User Datagram Protocol) or IPC (Inter-Process Communication).

After receiving the task sent by Jobs (distributed task scheduling platform), the deep learning framework (such as tf, pytorch) will be triggered to start, and the start of the deep learning framework will trigger the loading of the client-plugin (client control library). The client-plugin may send a message for requesting a graphics processing unit to the node manager and wait for the allocation by the node manager.

After the allocation is completed, the training task may be trained based on the allocated graphics processing unit resources. At this point, the client-plugin may report a heartbeat to the node manager and continuously update the duration of the task.

When the training task is completed, the client-plugin may perform subsequent operations of the task, such as sending a task done message to the node manager.

After receiving a message for requesting the graphics processing unit, the node manager may process the message and manage the graphics processing unit resources, to allocate the graphics processing unit resources for the training tasks. After obtaining the allocation strategy, the message may be responded to and a response graphics processing unit request may be sent to the client-plugin.

In addition, the node manager may also have the timeout management. In some embodiments, the node manager may determine whether to recycle the graphics processing unit resources allocated for the training task based on whether it receives the heartbeat information for the training task within the preset period. For example, the node manager presets the preset period of 5 seconds. If the node manager detects that it has not received the heartbeat information reported by the training task within 5 seconds, it will be considered a timeout. At this point, the graphics processing unit resources allocated for the training task may be recycled.

It should be noted that the above resource allocation method may be applied to the aforementioned artificial intelligence training system.

The embodiment of the present disclosure provides an artificial intelligence training system, including at least one node, a node manager and a client plugin library, a plurality of development environments being created in each node; the client plugin library is configured for, when detecting that a target training task in a target development environment is started, generating the target graphics processing unit request after redirecting the loading process of the target deep learning framework for the target training task, and sending the target graphics processing unit request to the node manager; the node manager is configured for, in response to the target graphics processing unit request, allocating graphics processing unit resources for the target training task; and the target deep learning framework performs artificial intelligence training using the graphics processing unit resources allocated by the node manager. Through the embodiments of the present disclosure, it is achieved to start from the perspective of the deep learning framework, analyze the loading logic of the deep learning framework when the training task is started, and achieve dynamic graphics processing unit sharing through hijacking the framework. The method is simple to implement and does not require modification of the framework, and users are unaware of it when using it. It is as flexible as the default graphics processing unit sharing mode.

And based on the dynamic sharing logic of the graphics processing units, the graphics processing unit resources are unbound from the development environment, and the graphics processing unit resources are allocated only when the user actually starts the training task, thus solving the problem of users idly occupying graphics processing unit resources under the pre-allocation mode, efficiently utilizing graphics processing unit resources of the node, and improving the overall utilization rate of graphics processing unit resources of the node.

Figure 8:
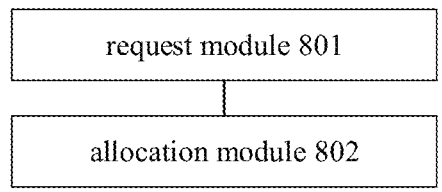
FIG. 8 is a schematic structural diagram of an apparatus of resource allocation according to an embodiment of the present disclosure.

Referring to FIG. 8, a schematic structural diagram of an apparatus of resource allocation according to an embodiment of the present disclosure is shown. The apparatus of resource allocation is applied to the artificial intelligence training system, the artificial intelligence training system includes a client plugin library and at least one node, a plurality of development environments are created in each node.

In some embodiments, the apparatus may include the following modules:

a request module 801 configured for, when it is detected that a target training task in a target development environment is started, acquiring a target graphics processing unit request from the client plugin library, among them, the target graphics processing unit request is generated after redirecting a loading process of a target deep learning framework for the target training task when the client plugin library detects that the target training task in the target development environment is started; and an allocation module 802 configured for, in response to the target graphics processing unit request, allocating graphics processing unit resources for the target training task.

In some embodiments of the present disclosure, the allocation module 802 is configured for determining a target graphics processing unit quota pre-configured for the target development environment; and according to the target graphics processing unit quota and the target graphics processing unit request, allocating the graphics processing unit resources for the target training task.

In some embodiments of the present disclosure, the apparatus further includes:

a quota receiving module configured for receiving a graphics processing unit quota input by a user for each of the plurality of development environments.

In some embodiments of the present disclosure, the target node corresponding to the target development environment is deployed with corresponding graphics processing unit resources, the target graphics processing unit quota includes a number of the target graphics processing unit quotas, and the allocation module 802 is configured for determining a number of graphics processing units currently used by the target development environment; in response to the number of the graphics processing units currently used being less than the number of the target graphics processing unit quotas, allocating the graphics processing unit resources for the target training task from graphics processing units not currently used by the target development environment in the graphics processing unit resources corresponding to the target node; and in response to the number of the graphics processing units currently used being equal to the number of the target graphics processing unit quotas, allocating the graphics processing unit resources for the target training task from the graphics processing units currently used by the target development environment.

In some embodiments of the present disclosure, the allocation module 802 is configured for determining a number of graphics processing units required for the target training task; in response to the number of the graphics processing units required being greater than the number of the graphics processing units currently used, generating scheduling failure information; and in response to the number of the graphics processing units required being not greater than the number of the graphics processing units currently used, sorting the graphics processing units currently used by the target development environment according to a number of tasks, and allocating the graphics processing unit resources for the target training task from top N graphics processing units with a minimum number of tasks of the graphics processing units currently used by the target development environment; where N is the number of the graphics processing units required for the target training task.

In some embodiments of the present disclosure, the allocation module 802 is configured for determining a current number of tasks of the graphics processing units not currently used by the target development environment, and determining a number of graphics processing units with the current number of tasks less than a task threshold; in response to the number of the graphics processing units with the current number of tasks less than the task threshold being less than a number of graphics processing units required for the target training task, allocating the graphics processing unit resources for the target training task from the graphics processing units with the current number of tasks less than the task threshold and the graphics processing units currently used by the target development environment; and in response to the number of the graphics processing units with the current number of tasks less than the task threshold being not less than the number of the graphics processing units required for the target training task, allocating the graphics processing unit resources for the target training task from the graphics processing units with the current number of tasks less than the task threshold.

In some embodiments of the present disclosure, the allocation module 802 is configured for, according to the number of the graphics processing units required for the target training task and a number of the graphics processing units not currently used by the target development environment in the graphics processing unit resources corresponding to the target node, determining a number of reused graphics processing units; in response to the number of the graphics processing units currently used being less than the number of the reused graphics processing units, generating scheduling failure information; and in response to the number of the graphics processing units currently used being not less than the number of the reused graphics processing units, allocating the graphics processing unit resources for the target training task from top M graphics processing units with a minimum number of tasks of the graphics processing units currently used by the target development environment and the graphics processing units with the current number of tasks less than task threshold; where M is the number of the reused graphics processing units.

In some embodiments of the present disclosure, the apparatus further includes:
an allocation information generation module configured for generating and storing allocation information of the graphics processing unit resources for each of the plurality of development environments.

In some embodiments of the present disclosure, the target graphics processing unit quota further includes a target graphics processing unit memory quota capacity, and the allocation module 802 is further configured for, according to the target graphics processing unit memory quota capacity, allocating a graphics processing unit memory capacity for the target training task.

In some embodiments of the present disclosure, the allocation module 802 is configured for determining whether any other training task is in the target development environment when starting the target training task; in response to no other training task being in the target development environment, according to the target graphics processing unit memory quota capacity, allocating the graphics processing unit memory capacity for the target training task; in response to another training task being in the target development environment, determining a remaining graphics processing unit memory quota capacity of the target development environment according to the target training task, and updating the allocation information according to the remaining graphics processing unit memory quota capacity of the target development environment.

In some embodiments of the present disclosure, the apparatus further includes:
a first recycling module configured for, when it is detected that the target training task is ended, recycling the graphics processing unit resources allocated for the target training task.

In some embodiments of the present disclosure, the apparatus further includes:
a second recycling module configured for, when no heartbeat information for the target training task is received within a preset period, recycling the graphics processing unit resources allocated for the target training task.

In this embodiment of the present disclosure, when it is detected that the target training task in the target development environment is started, the loading of the client plugin library will be triggered. Therefore, the client plugin library may redirect the loading process of the target deep learning framework for the target training task, to hijack the startup process of the deep learning framework, and a target graphics processing unit request is generated during this process to request the allocation of graphics processing unit resources for the target training task. Compared to the prior art, this embodiment of the present disclosure starts from the perspective of the deep learning framework, analyzes the loading logic of the deep learning framework when the training task is started, and achieves dynamic graphics processing unit sharing through hijacking the framework. The method is simple to implement and does not require modification of the framework, and users are unaware of it when using it. It is as flexible as the default graphics processing unit sharing mode. And based on the dynamic sharing logic of the graphics processing units, the graphics processing unit resources are unbound from the development environment, and the graphics processing unit resources are allocated only when the user actually starts the training task, thus solving the problem of users idly occupying graphics processing unit resources under the pre-allocation mode, efficiently utilizing graphics processing unit resources of the node, and improving the overall utilization rate of graphics processing unit resources of the node.

Figure 9:
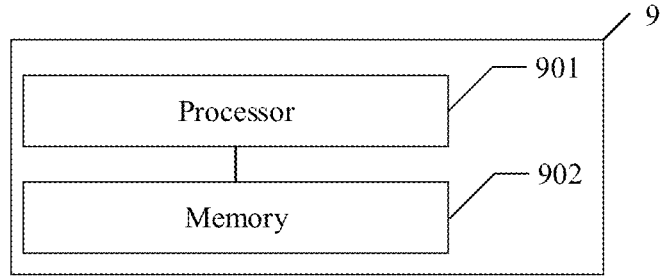
FIG. 9 is a schematic structural diagram of an electronic device according to an embodiment of the present disclosure.

An embodiment of the present disclosure further provides an electronic device, as shown in FIG. 9, the electronic device 9 includes a processor 901, a memory 902, and a computer program stored on the memory 902 and capable of running on the processor, the computer program, when executed by the processor, implements the method of resource allocation described above.

Figure 10:
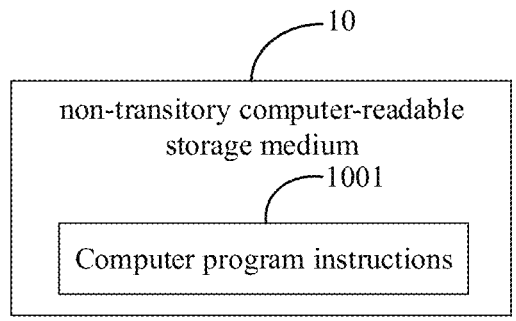
FIG. 10 is a schematic diagram of a non-transitory computer-readable storage medium according to an embodiment of the present disclosure.

An embodiment of the present disclosure further provides a non-transitory computer-readable storage medium, as shown in FIG. 10, a computer program 1001 is stored on the non-transitory computer-readable storage medium 10, and the computer program 1001, when executed by a processor, implements the method of resource allocation described above.

For the device embodiments, due to its basic similarity with the method embodiments, the description is relatively simple. For relevant information, please refer to the explanation of the method embodiments.

The various embodiments in this specification are described in a progressive manner, with each embodiment emphasizing its differences from other embodiments. The same and similar parts between the various embodiments may be referred to each other.

Persons skilled in the art should understand that the embodiments of the present application may be provided as methods, devices, or computer program products. Therefore, the embodiments of the present disclosure may take the form of fully hardware embodiments, fully software embodiments, or embodiments combining software and hardware aspects. Moreover, the embodiments of the present disclosure may take the form of a computer program product implemented on one or more non-volatile computer usable storage media (including but not limited to disk storage, CD-ROM, optical storage, etc.) containing computer usable program code.

The embodiments of the present disclosure are described with reference to the flow chart and/or block diagram of the method, terminal device (system), and computer program product according to the embodiments of the present disclosure. It should be understood that each process and/or block in the flow chart and/or block diagram, as well as the combination of processes and/or blocks in the flow chart and/or block diagram, may be implemented by computer program instructions. These computer program instructions may be provided to a processor of a general-purpose computer, specialized computer, embedded processor, or other programmable data processing terminal device to generate a machine, such that the instructions executed by the processor of the computer or other programmable data processing terminal device generate a device for implementing the functions specified in one or more processes in the flow chart and/or one or more boxes in the block diagram.

These computer program instructions may also be stored in computer-readable memory that may guide a computer or other programmable data processing terminal device to operate in a specific manner, such that the instructions stored in the computer-readable memory generate a manufactured product including instruction devices that implement the functions specified in a flowchart or multiple flow charts and/or a block diagram or multiple boxes.

These computer program instructions may also be loaded onto a computer or other programmable data processing terminal device, enabling a series of operational steps to be executed on the computer or other programmable terminal device to generate computer implemented processing. The instructions executed on the computer or other programmable terminal device provide steps for implementing the functions specified in one or more processes in the flow chart and/or one or more boxes in the block diagram.

Although preferred embodiments of the present disclosure have been described, those skilled in the art may make additional changes and modifications to these embodiments once they have knowledge of the basic inventive concept. Therefore, the attached claims are intended to be interpreted as including preferred embodiments and all changes and modifications falling within the scope of the embodiments of the present disclosure.

Finally, it should be noted that in this specification, relational terms such as first and second are only used to distinguish one entity or operation from another, and do not necessarily require or imply any actual relationship or order between these entities or operations. Moreover, the terms "including", "comprising", or any other variation thereof are intended to encompass non-exclusive inclusion, such that a process, method, article, or terminal device that includes a series of elements includes not only those elements, but also other elements not explicitly listed, or elements inherent to such process, method, article, or terminal device. Without further limitations, the element limited by the statement "including one . . . " does not exclude the existence of other identical elements in the process, method, item, or terminal device that includes the element.

The above provides a detailed introduction to the method and apparatus of resource allocation and an artificial intelligence training system provided. This specification applies specific examples to explain the principles and implementation methods of the present disclosure. The above embodiments are only used to help understand the method and core idea of the present disclosure. Meanwhile, for persons skilled in the art, there may be changes in the specific implementation and application scope based on the ideas of the present disclosure. Therefore, the content of this specification should not be understood as limiting the present disclosure.

The invention claimed is:

1. A method of resource allocation, applied to an artificial intelligence training system, and the method comprising:
when detecting by the artificial intelligence training system that a target training task in a target development environment has started, acquiring, by the artificial intelligence training system, a target graphics processing unit request from the client plugin library, wherein after redirecting a loading process of a target deep learning framework for the target training task when the client plugin library detects that the target training task in the target development environment is started;
wherein the artificial intelligence training system comprises the client plugin library and at least one node; a plurality of development environments are created in each node, each of the plurality of development environments is provided with a corresponding graphics processing unit quota, the graphics processing unit quota is a maximum available graphics processing unit resource for a corresponding development environment when each of the plurality of development environments is created;

when detecting by the artificial intelligence training system that the target training task in the target development environment has started, triggering a loading of the client plugin library, to redirect the loading process of the target deep learning framework for the target training task, hijack a startup process of the deep learning framework, and generating the target graphics processing unit request to request an allocation of the graphics processing unit resources for the target training task;

determining, by the artificial intelligence training system, a target graphics processing unit quota pre-configured for the target development environment; and according to the target graphics processing unit quota and the target graphics processing unit request, allocating, by the artificial intelligence training system, the graphics processing unit resources for the target training task;

wherein the target graphics processing unit quota further comprises a target graphics processing unit memory quota capacity, and according to the target graphics processing unit quota and the target graphics processing unit request, allocating, by the artificial intelligence training system, the graphics processing unit resources for the target training task further comprises:

according to the target graphics processing unit memory quota capacity, allocating, by the artificial intelligence training system, a graphics processing unit memory capacity for the target training task.

2. The method according to claim 1, wherein the method further comprises:

receiving a graphics processing unit quota input by a user for each of the plurality of development environments.

3. The method according to claim 2, wherein a target node corresponding to the target development environment is deployed with corresponding graphics processing unit resources, the target graphics processing unit quota comprises a number of the target graphics processing unit quotas, and according to the target graphics processing unit quota and the target graphics processing unit request, allocating the graphics processing unit resources for the target training task comprises:

determining a number of graphics processing units currently used by the target development environment;

in response to the number of the graphics processing units currently used being less than the number of the target graphics processing unit quotas, allocating the graphics processing unit resources for the target training task from graphics processing units not currently used by the target development environment in the graphics processing unit resources corresponding to the target node; and in response to the number of the graphics processing units currently used being equal to the number of the target graphics processing unit quotas, allocating the graphics processing unit resources for the target training task from the graphics processing units currently used by the target development environment.

4. The method according to claim 3, wherein allocating the graphics processing unit resources for the target training task from the graphics processing units currently used by the target development environment comprises:

determining a number of graphics processing units required for the target training task;

in response to the number of the graphics processing units required being greater than the number of the graphics processing units currently used, generating scheduling failure information; and in response to the number of the graphics processing units required being not greater than the number of the graphics processing units currently used, sorting the graphics processing units currently used by the target development environment according to a number of tasks, and allocating the graphics processing unit resources for the target training task from top N graphics processing units with a minimum number of tasks of the graphics processing units currently used by the target development environment;

wherein N is the number of the graphics processing units required for the target training task.

5. The method according to claim 3, wherein allocating the graphics processing unit resources for the target training task from the graphics processing units not currently used by the target development environment in the graphics processing unit resources corresponding to the target node comprises:

determining a current number of tasks of the graphics processing units not currently used by the target development environment, and determining a number of graphics processing units with the current number of tasks less than a task threshold;

in response to the number of the graphics processing units with the current number of tasks less than the task threshold being less than a number of graphics processing units required for the target training task, allocating the graphics processing unit resources for the target training task from the graphics processing units with the current number of tasks less than the task threshold and the graphics processing units currently used by the target development environment; and in response to the number of the graphics processing units with the current number of tasks less than the task threshold being not less than the number of the graphics processing units required for the target training task, allocating the graphics processing unit resources for the target training task from the graphics processing units with the current number of tasks less than the task threshold.

6. The method according to claim 5, wherein allocating the graphics processing unit resources for the target training task from the graphics processing units with the current number of tasks less than the task threshold and the graphics processing units currently used by the target development environment comprises:

according to the number of the graphics processing units required for the target training task and a number of the graphics processing units not currently used by the target development environment in the graphics processing unit resources corresponding to the target node, determining a number of graphics processing units that need to be reused;

in response to the number of the graphics processing units currently used being less than the number of the graphics processing units that need to be reused, generating scheduling failure information; and in response to the number of the graphics processing units currently used being not less than the number of the graphics processing units that need to be reused, allocating the graphics processing unit resources for the target training task from top M graphics processing units with a minimum number of tasks of the graphics processing units currently used by the target development environment and the graphics processing units with the current number of tasks less than task threshold;

wherein M is the number of the graphics processing units that need to be reused.

7. The method according to claim 3, wherein the method further comprises:

generating and storing allocation information of the graphics processing unit resources for each of the plurality of development environments.

8. The method according to claim 7, wherein according to the target graphics processing unit memory quota capacity, allocating the graphics processing unit memory capacity for the target training task comprises:

determining whether any other training task is in the target development environment when starting the target training task;

in response to no other training task being in the target development environment, according to the target graphics processing unit memory quota capacity, allocating the graphics processing unit memory capacity for the target training task;

in response to another training task being in the target development environment, determining a remaining graphics processing unit memory quota capacity of the target development environment according to the target training task, and updating the allocation information according to the remaining graphics processing unit memory quota capacity of the target development environment.

9. The method according to claim 1, wherein the method further comprises:

when it is detected that the target training task is ended, recycling the graphics processing unit resources allocated for the target training task.

10. The method according to claim 1, wherein the method further comprises:

when no heartbeat information for the target training task is received within a preset period, recycling the graphics processing unit resources allocated for the target training task.

11. An artificial intelligence training system, comprising at least one node, a node manager and a client plugin library, a plurality of development environments being created in each node; each of the plurality of development environments is provided with a corresponding graphics processing unit quota, the graphics processing unit quota is a maximum available graphics processing unit resource of the development environment input by a user for a corresponding development environment when each of the plurality of development environments is created, wherein the client plugin library is configured for, when detecting that a target training task in a target development environment is started, generating a target graphics processing unit request after redirecting a loading process of a target deep learning framework for the target training task, and sending the target graphics processing unit request to the node manager; and a target node corresponding to the target development environment is deployed with a corresponding graphics processing unit and a memory;

the node manager is configured for determining a target graphics processing unit quota pre-configured for the target development environment, and according to the target graphics processing unit quota and the target graphics processing unit request, allocating the graphics processing unit resources for the target training task; and the node manager comprises a memory, and the memory is configured to store allocation information of the graphics processing unit resources for each development environment and store a graphics processing unit quota input by the user for each of the plurality of development environments;

the target deep learning framework performs artificial intelligence training using the graphics processing unit resources allocated by the node manager;

wherein the target graphics processing unit quota further comprises a target graphics processing unit memory quota capacity;

the node manager is further configured for, according to the target graphics processing unit memory quota capacity, allocating a graphics processing unit memory capacity for the target training task.

12. The system according to claim 11, wherein the node manager comprises a graphics processing unit management module;

the graphics processing unit management module is configured for storing a graphics processing unit quota input by a user for each of the plurality of development environments.

13. The system according to claim 12, wherein the target node corresponding to the target development environment is deployed with corresponding graphics processing unit resources, the target graphics processing unit quota comprises a number of the target graphics processing unit quotas;

the node manager is configured for determining a number of graphics processing units currently used by the target development environment; in response to the number of the graphics processing units currently used being less than the number of the target graphics processing unit quotas, allocating the graphics processing unit resources for the target training task from graphics processing units not currently used by the target development environment in the graphics processing unit resources corresponding to the target node; and in response to the number of the graphics processing units currently used being equal to the number of the target graphics processing unit quotas, allocating the graphics processing unit resources for the target training task from the graphics processing units currently used by the target development environment.

14. The system according to claim 13, wherein the node manager is configured for determining a number of graphics processing units required for the target training task; in response to the number of the graphics processing units required being greater than the number of the graphics processing units currently used, generating scheduling failure information; and in response to the number of the graphics processing units required being not greater than the number of the graphics processing units currently used, sorting the graphics processing units currently used by the target development environment according to a number of tasks, and allocating the graphics processing unit resources for the target training task from top N graphics processing units with a minimum number of tasks of the graphics processing units currently used by the target development environment; wherein N is the number of the graphics processing units required for the target training task.

15. The system according to claim 13, wherein
the node manager is configured for determining a current number of tasks of the graphics processing units not currently used by the target development environment, and determining a number of graphics processing units with the current number of tasks less than a task threshold; in response to the number of the graphics processing units with the current number of tasks less than the task threshold being less than a number of graphics processing units required for the target training task, allocating the graphics processing unit resources for the target training task from the graphics processing units with the current number of tasks less than the task threshold and the graphics processing units currently used by the target development environment; and in response to the number of the graphics processing units with the current number of tasks less than the task threshold being not less than the number of the graphics processing units required for the target training task, allocating the graphics processing unit resources for the target training task from the graphics processing units with the current number of tasks less than the task threshold.

16. The system according to claim 15, wherein
the node manager is configured for, according to the number of the graphics processing units required for the target training task and a number of the graphics processing units not currently used by the target development environment in the graphics processing unit resources corresponding to the target node, determining a number of graphics processing units that need to be reused; in response to the number of the graphics processing units currently used being less than the number of the graphics processing units that need to be reused, generating scheduling failure information; and in response to the number of the graphics processing units currently used being not less than the number of the graphics processing units that need to be reused, allocating the graphics processing unit resources for the target training task from top M graphics processing units with a minimum number of tasks of the graphics processing units currently used by the target development environment and the graphics processing units with the current number of tasks less than task threshold; wherein M is the number of the graphics processing units that need to be reused.

17. The system according to claim 13, wherein the node manager comprises an auxiliary module;
the auxiliary module is configured for recording an allocation process of the node manager, and generating and storing allocation information of the graphics processing unit resources for each of the plurality of development environments.

18. The system according to claim 17, wherein
the node manager is configured for determining whether any other training task is in the target development environment when starting the target training task; in response to no other training task being in the target development environment, according to the target graphics processing unit memory quota capacity, allocating the graphics processing unit memory capacity for the target training task; in response to another training task being in the target development environment, determining a remaining graphics processing unit memory quota capacity of the target development environment according to the target training task, and updating the allocation information according to the remaining graphics processing unit memory quota capacity of the target development environment.

19. A non-transitory computer-readable storage medium, wherein a computer program is stored on the non-transitory computer-readable storage medium, and the computer program, when executed by a processor, implements the method of resource allocation according to claim 1.

* * * * *